US012036683B2

(12) United States Patent
Vu et al.

(10) Patent No.: US 12,036,683 B2
(45) Date of Patent: *Jul. 16, 2024

(54) SAFE MOTION PLANNING FOR MACHINERY OPERATION

(71) Applicants: Clara Vu, Cambridge, MA (US); Scott Denenberg, Newton, MA (US); Patrick Sobalvarro, Harvard, MA (US); Alberto Moel, Cambridge, MA (US)

(72) Inventors: Clara Vu, Cambridge, MA (US); Scott Denenberg, Newton, MA (US); Patrick Sobalvarro, Harvard, MA (US); Alberto Moel, Cambridge, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,933

(22) Filed: Oct. 3, 2023

(65) Prior Publication Data

US 2024/0042616 A1 Feb. 8, 2024

Related U.S. Application Data

(63) Continuation of application No. 17/319,367, filed on May 13, 2021, now Pat. No. 11,820,025, which is a
(Continued)

(51) Int. Cl.
*G06T 17/10* (2006.01)
*B25J 9/16* (2006.01)
(Continued)

(52) U.S. Cl.
CPC ........... *B25J 9/1694* (2013.01); *B25J 9/1666* (2013.01); *B25J 9/1676* (2013.01); *B25J 9/1697* (2013.01);
(Continued)

(58) Field of Classification Search
CPC ..................................................... G01S 7/4808
See application file for complete search history.

(56) References Cited

U.S. PATENT DOCUMENTS 6,212,444 B1 4/2001 Kato et al.
6,297,844 B1 10/2001 Schatz et al.
(Continued)

FOREIGN PATENT DOCUMENTS

CN 103582851 A 2/2014
CN 104870147 A 8/2015
(Continued)

OTHER PUBLICATIONS

European Search Report, European Patent Application No. 22182665. 4, dated Oct. 10, 2022, 9 pages.
(Continued)

*Primary Examiner* — Edward Park
(74) *Attorney, Agent, or Firm* — Morgan, Lewis & Bockius LLP

(57) ABSTRACT

Systems and methods monitor a workspace for safety purposes using sensors distributed about the workspace. The sensors are registered with respect to each other, and this registration is monitored over time. Occluded space as well as occupied space is identified, and this mapping is frequently updated. Based on the mapping, a constrained motion plan of machinery can be generated to ensure safety.

20 Claims, 10 Drawing Sheets

Related U.S. Application Data continuation-in-part of application No. 17/101,622, filed on Nov. 23, 2020, now Pat. No. 11,279,039, which is a continuation of application No. 16/129,999, filed on Sep. 13, 2018, now Pat. No. 10,899,007, which is a continuation of application No. 15/889,523, filed on Feb. 6, 2018, now Pat. No. 10,099,372.

(60) Provisional application No. 62/455,828, filed on Feb. 7, 2017, provisional application No. 62/455,834, filed on Feb. 7, 2017.

(51) Int. Cl.

| | | |
|---|---|---|
| *G01S 7/48* | (2006.01) | |
| *G01S 17/04* | (2020.01) | |
| *G01S 17/87* | (2020.01) | |
| *G01S 17/89* | (2020.01) | |
| *G01V 8/20* | (2006.01) | |
| *G06T 17/05* | (2011.01) | |

(52) U.S. Cl.
CPC .......... *G01S 7/4808* (2013.01); *G01S 17/04* (2020.01); *G01S 17/87* (2013.01); *G01S 17/89* (2013.01); *G06T 17/10* (2013.01); *G01V 8/20* (2013.01); *G05B 2219/40202* (2013.01); *G06T 17/05* (2013.01); *Y10S 901/47* (2013.01); *Y10S 901/49* (2013.01)

(56) References Cited

U.S. PATENT DOCUMENTS

| | | | |
|---|---|---|---|
| 6,816,755 B2 | 11/2004 | Habibi et al. | |
| 7,336,814 B2 | 2/2008 | Boca et al. | |
| 8,154,590 B2 | 4/2012 | Krissel et al. | |
| 8,253,792 B2 | 8/2012 | Wells et al. | |
| 8,437,535 B2 | 5/2013 | Boca et al. | |
| 8,556,999 B2 | 10/2013 | Boca | |
| 8,700,197 B2 | 4/2014 | Plociennik et al. | |
| 8,914,152 B2 | 12/2014 | Scheurer et al. | |
| 9,043,025 B2 | 5/2015 | Brooks et al. | |
| 9,122,266 B2 | 9/2015 | Franke et al. | |
| 9,240,070 B2 | 1/2016 | Anderson-Sprecher et al. | |
| 9,283,678 B2 | 3/2016 | Kuttner, Jr. et al. | |
| 9,452,531 B2 | 9/2016 | Kikkeri et al. | |
| 9,692,251 B2 | 6/2017 | Anderson-Sprecher et al. | |
| 9,734,401 B2 | 8/2017 | Hunt | |
| 9,740,193 B2 | 8/2017 | Hunt | |
| 9,757,859 B1* | 9/2017 | Kolb | B25J 5/007 |
| 9,827,681 B2 | 11/2017 | Naitou et al. | |
| 10,078,333 B1* | 9/2018 | Bajracharya | B25J 9/1697 |
| 10,150,213 B1* | 12/2018 | Linnell | B25J 9/1679 |
| 2005/0207618 A1 | 9/2005 | Wohler et al. | |
| 2008/0021597 A1 | 1/2008 | Merte et al. | |
| 2008/0152192 A1 | 6/2008 | Zhu et al. | |
| 2009/0015663 A1 | 1/2009 | Doettling et al. | |
| 2011/0264266 A1 | 10/2011 | Kock | |
| 2012/0022689 A1 | 1/2012 | Kapoor | |
| 2012/0307067 A1 | 12/2012 | Chen et al. | |
| 2013/0201292 A1 | 8/2013 | Walter et al. | |
| 2013/0211766 A1 | 8/2013 | Rosenberg et al. | |
| 2014/0093130 A1 | 4/2014 | Dasu et al. | |
| 2014/0188274 A1 | 7/2014 | Namiki | |
| 2014/0267266 A1 | 9/2014 | Crassin et al. | |
| 2014/0288710 A1 | 9/2014 | Ikenaga et al. | |
| 2015/0049911 A1 | 2/2015 | Doettling et al. | |
| 2015/0199840 A1* | 7/2015 | Hatanaka | A61B 6/5211 345/424 |
| 2015/0217455 A1 | 8/2015 | Kikkeri et al. | |
| 2015/0269427 A1 | 9/2015 | Kim et al. | |
| 2015/0287196 A1 | 10/2015 | De Villiers et al. | |
| 2015/0293600 A1 | 10/2015 | Sears | |
| 2015/0294496 A1 | 10/2015 | Medasani et al. | |
| 2016/0092739 A1 | 3/2016 | Oami et al. | |
| 2016/0188977 A1 | 3/2016 | Kearns | |
| 2016/0282126 A1 | 9/2016 | Watts et al. | |
| 2016/0354927 A1 | 12/2016 | Kikkeri et al. | |
| 2017/0057095 A1 | 3/2017 | Oestergaard et al. | |
| 2017/0101278 A1 | 4/2017 | Stone et al. | |
| 2017/0113352 A1 | 6/2017 | Lutz | |
| 2017/0151676 A1 | 6/2017 | Atherton et al. | |
| 2017/0249129 A1 | 8/2017 | McDaniel | |
| 2017/0292836 A1 | 10/2017 | Jai et al. | |
| 2017/0302905 A1 | 10/2017 | Shteinfeld et al. | |
| 2017/0334063 A1 | 11/2017 | Komatsuzaki et al. | |
| 2017/0334066 A1 | 11/2017 | Levine et al. | |
| 2017/0334076 A1 | 11/2017 | Bordegnoni et al. | |
| 2017/0341231 A1 | 11/2017 | Tan et al. | |
| 2017/0355079 A1 | 12/2017 | Takahashi | |
| 2018/0120804 A1 | 5/2018 | Higuchi et al. | |
| 2018/0318704 A1 | 11/2018 | Ikenoue et al. | |
| 2019/0061158 A1 | 2/2019 | Vu et al. | |

FOREIGN PATENT DOCUMENTS

| | | |
|---|---|---|
| CN | 104933392 A | 9/2015 |
| CN | 110494900 A | 2/2018 |
| EP | 324874 | 11/2017 |
| JP | 2010/208002 A | 9/2010 |
| WO | WO 2016122840 | 8/2016 |
| WO | WO 2017199261 | 11/2017 |
| WO | WO 2017203937 | 11/2017 |
| WO | WO 2017207436 | 12/2017 |

OTHER PUBLICATIONS

International Search Report, for International Application No. PCT/US2018/016991, dated May 16, 2018, 12 pages.
Anandan, Tanya M. "The Shrinking Footprint of Robot Safety," Robotics Online, Oct. 6, 2014, 9 pages.
Anandan, Tanya M., "The End of Separation: Man and Robot as Collaborative Coworkers on the Factory Floor," Robotics Online, Jun. 6, 2013, 8 pages.
Cui, et al., "Robotics Safety: An Engineering Teaching Module," University of Ontario, Institute of Technology, Minerva Canada, Mar. 2014, 39 pages.
Fretzner, et al., "Obstacle Detection and Tracking for Safe Human-Robot Interaction Based on Multi-Sensory Point Clouds".
Flacco, et al., "A Depth Space Approach to Human-Robot Collision Avoidance," 2012 IEEE International Conference Jn Robotics and Automation, May 14-18, 2012, 8 pages.
Frank, Rudiger, Dr., "Modular Sensor System for Safe Robots", hllps://www.automalion.com/automation-news/article/ modular-sensor-system-for-safe-robots, Nov. 25, 2017, 14 pages.
Frese, et al., "Multi-Sensor Obstacle Tracking for Safe Human-Robol Inleralion," Fraunhofer Institute of Optronics, System Technologies and Image Explilalion IOSB, 2014, 8 pages.
Kock, et al., "Taming the robot," Robotic Highlights, ABB Review, Apr. 2006, 4 pages.
Lacevic, et al., "Kinetostatic danger field—A novel safety assessment for human-robot interation," ResearchGate, Jun. 9, 2016, 8 pages.
Lasota, et al., "A Survey of Methods for Safe Human-Robt Interation," Foundations and Trends in Robotics, vol. 5, No. J (2014), 92 pages.
Lasota, et al., "Toward Safe Close-Proximity Human-Robot Interaction with Standard Industrial Robots," IEEE, 2014, 7 pages.
Lenz, et al., "Fusing multiple Kinects to survey shared Human-Robot-Workspaces," Robotics and Embedded Systems Department of Infonrmatics Technische Universit at Munchen, 6 pages.
Murray, et al., "Robot Motion Planning on a Chip," Departments of Computer Science and Electrical & Computer Engineering Duke University, 9 pages.
Pilz, GB, "Safe human-robot collaboration: from theory to practice," hllps://www.pilz.com/en-GB/company/news/article/084837. Aug. 6, 2015, 4 pages.
Rybski, et al., "Sensor Fusion for Human Safety in Industrial Workcells," Carnegie Mellon University Research showcase@CMU, Oct. 2012, 9 pages.

(56) References Cited

OTHER PUBLICATIONS

ABB Robotics Produce Management, "SafeMove2," Jul. 24, 2017, 25 pages.

ABB Robotics Produce Management, "SafeMove2 Protecting operators & enhancing robot safety", abb.com/robotics, 2 pages.

Vogel, et al., "A Projection-based Sensor System for Safe Physical Human-Robot Collaboration," 2013 IEEE/RSJ International Conference on Intelligent Robots and Systems (IROS), Nov. 3-7, 2013, 6 pages.

Zanchettin, et al., "Safety in Human-Robot Collaborative Manufacturing Environments: Metrics and Control," IEEE Transactions on Automation Science and Engineering, vol. 13, No. 2, Apr. 2016, 12 pages.

Christiernin, et al., "Safety Critical Robot Programming and Testing for Operations in Industrial Co-production," IEEE International Symposium on Software Reliability Engineering Workshops, 2014, 4 pages.

Graham, et al., "A Sensory-Based Robotic Safety System," IEE Proceedings, vol. 132, PID, No. 4, Jul. 1985, 7 pages.

Graham, et al., "A Safety and Collision Avoidance System for Industrial Robots," IEEE Transactions on Industry Application, vol. IA-22, No. 1 Jan./Feb. 1986, 9 pages.

Slembrouck et al., "Self-Learning voxel-based multi-camera occlusion maps for 3D reconstruction," 2014 International Conference on Computer Vision Theory and Applications (VISAPP), vol. 2, pp. 502-509, https://ieeexplore.ieee.org/document/7294971, Jan. 5, 2014.

Hansung et al., "Robust Foreground Segmentation from Color Video Sequences Using Background Subtraction with Multiple Thresholds," Proc. KJPR, https://www.researchgate.net/publication/228950411_Robust_Foreground_Segmentation_from_Color_Video_Sequences_Using_Background_Subtraction_with_Multiple_Thresholds, Jan. 2006.

Cheung et al, "A Real Time Systems for Robust 3D Voxel Reconstruction of Human Motions", Proceeding IEEE Conference on Computer Vision and Pattern Recognition, vol. 2, pp. 714-720, https://ieeexplore.ieee.org/document/854944, Jun. 15, 2000.

\* cited by examiner

SAFE MOTION PLANNING FOR MACHINERY OPERATION

CROSS-REFERENCE TO RELATED APPLICATION

This application is a continuation of U.S. application Ser. No. 17/319,367, filed on May 13, 2021, which is a continuation-in-part of U.S. application Ser. No. 17/101,622, filed Nov. 23, 2020, which is a continuation of U.S. application Ser. No. 16/129,999, filed Sep. 13, 2018 (now U.S. Pat. No. 10,899,007), which is a continuation of U.S. application Ser. No. 15/889,523, filed Feb. 6, 2018 (now U.S. Pat. No. 10,099,372), which claims priority to and the benefit of U.S. Provisional Patent Application Nos. 62/455,828 and 62/455,834, both filed on Feb. 7, 2017. The entire disclosures of these priority documents are hereby incorporated by reference in their entireties.

FIELD OF THE INVENTION

The field of the invention relates, generally, to ensuring safe operation of industrial machinery, and in particular to systems and methods for detecting safe and/or unsafe conditions in a monitored workspace and, based thereon, planning safety-constrained motion of the machinery.

BACKGROUND

Industrial machinery is often dangerous to humans. Some machinery is dangerous unless it is completely shut down, while other machinery may have a variety of operating states, some of which are hazardous and some of which are not. In some cases, the degree of hazard may depend on the location or distance of the human with respect to the machinery. As a result, many "guarding" approaches have been developed to separate humans and machines and to prevent machinery from causing harm to humans. One very simple and common type of guarding is simply a cage that surrounds the machinery, configured such that opening the door of the cage causes an electrical circuit to place the machinery in a safe state. If the door is placed sufficiently far from the machinery to ensure that the human can't reach it before it shuts down, this ensures that humans can never approach the machinery while it is operating. Of course, this prevents all interaction between human and machine, and severely constrains use of the workspace.

More sophisticated types of guarding may involve, for example, optical sensors. Examples include light curtains that determine if any object has intruded into a region monitored by one or more light emitters and detectors, and 2D LIDAR sensors that use active optical sensing to detect the minimum distance to an obstacle along a series of rays emanating from the sensor, and thus can be configured to detect either proximity or intrusion into pre-configured two-dimensional (2D) zones. More recently, systems have begun to employ 3D depth information using, for example, 3D time-of-flight cameras, 3D LIDAR, and stereo vision cameras. These sensors offer the ability to detect and locate intrusions into the area surrounding industrial machinery in 3D, which has several advantages. For example, a 2D LIDAR system guarding an industrial robot will have to stop the robot when an intrusion is detected well beyond an arm's-length distance away from the robot, because if the intrusion represents a person's legs, that person's arms could be much closer and would be undetectable by the 2D LIDAR. However, a 3D system can allow the robot to continue to operate until the person actually stretches his or her arm towards the robot. This allows a much tighter interlock between the actions of the machine and the actions of the human, which facilitates many applications and saves space on the factory floor, which is always at a premium. Additionally, in complex workcells it can be very difficult to determine a combination of 2D planes that effectively monitors the entire space; 3D sensors properly configured, can alleviate this issue.

Because human safety is at stake, guarding equipment must typically comply with stringent industry standards. These standards may specify failure rates for hardware components and rigorous development practices for both hardware and software components. Standards-compliant systems must ensure that dangerous conditions can be detected with very high probability, that failures of the system itself are detected, and that the system responds to detected failures by transitioning the equipment being controlled to a safe state. Simply keeping humans and machines apart represents a far simpler guarding task than detecting unsafe conditions when humans actively work with machines that can injure them.

Task performance by a robot generally involves some degree of motion planning, i.e., finding a collision-free path from a robot's starting position and/or state to a goal position and/or state. Most simply, motion planning provides a trajectory along which the robot can move its linked arm to reach a desired object without colliding with itself or other objects. Introducing the possibility of humans moving into and out of proximity to the robot substantially complicates motion planning, since, as noted, safety standards are stringent and human movements are not always predictable. An optimized sequence of trajectories for performing a task may become suboptimal if interrupted by movement of humans and other "dynamic obstacles." It may be necessary to stop or slow the robot temporarily or recompute one or more trajectories altogether. Accordingly, a need exists for motion-planning methodologies that incorporate safety constraints and knowledge of moving humans and objects in a workspace. Ideally, such methodologies would maximize efficient use of the controlled machinery while adhering to rigorous safety standards.

SUMMARY

Embodiments of the present invention provide systems and methods for monitoring a workspace for safety purposes using sensors distributed about the workspace. The workspace may contain one or more pieces of equipment that can be dangerous to humans, for example, an industrial robot and auxiliary equipment such as parts feeders, rails, clamps, or other machines. The sensors are registered with respect to each other, and this registration is monitored over time. Occluded space as well as occupied space is identified, and this mapping is frequently updated.

Regions within the monitored space may be marked as occupied, unoccupied or unknown; only empty space can ultimately be considered safe, and only when any additional safety criteria—e.g., minimum distance from a piece of controlled machinery—is satisfied. In general, raw data from each sensor is analyzed to determine whether, throughout the zone of coverage corresponding to the sensor, an object or boundary of the 3D mapped space has been definitively detected.

In various embodiments, once the safe zone(s) is identified using the sensor data, a constrained motion plan for the machinery specifying a trajectory and/or a state (e.g., an orientation, a pose, a velocity, etc.) of the machinery from the commencement to the end of a task can be computationally created. Based on the constrained motion plan, the machinery may perform the task without entering the identified unsafe zone(s)—i.e., the machinery and its appendages are constrained to operate within the unoccupied space or space explicitly defined as safe. In one implementation, the motion plan includes multiple trajectories; each trajectory may be assigned with a cost value based on, for example, the length of the trajectory and/or an operation time of the machinery on the trajectory. The trajectory corresponding to the minimal cost value (e.g., the shortest length and/or shortest operation time) and satisfying the safety constraint may be elected, and the machinery can then perform the task in accordance with the selected trajectory. This approach maximizes efficient operation of the machinery within the constraints of safety.

As a person moves within a 3D space, he or she will typically occlude some areas from some sensors, resulting in areas of space that are temporarily unknown. Additionally, moving machinery such as an industrial robot arm can also temporarily occlude some areas. When the person or machinery moves to a different location, one or more sensors will once again be able to observe the unknown space and return it to the confirmed-empty state and therefore safe for the robot or machine to operate in this space. Accordingly, in some embodiments, space may also be classified as "potentially occupied." Unknown space is considered potentially occupied when a condition arises where unknown space could be occupied. This could occur when unknown space is adjacent to entry points to the workspace or if unknown space is adjacent to occupied or potentially occupied space. The potentially occupied space "infects" unknown space at a rate that is representative of a human moving through the workspace. Potentially occupied space stays potentially occupied until it is observed to be empty. For safety purposes, potentially occupied space is treated the same as occupied space.

For some sensor modalities such as those relying on an active optical signal, the ability of a sensor to definitively detect an object or boundary falls off rapidly with distance; that is, beyond a certain distance, a sensor may not be capable of distinguishing between an object and empty space, since the associated illumination levels are too similar. Points or regions at such locations are marked as "unknown" with respect to the relevant sensor, and regions so marked cannot be confirmed as empty by that sensor.

In some embodiments, the motion plan is dynamically adjusted based on the real-time monitoring of the workspace by the sensors. For example, as the person and/or machinery move within the 3D workspace, the safe zone(s) corresponding to the unoccupied space may be updated to avoid colliding with the person and/or machinery. As a result, the trajectory (or trajectories) of the machinery in the motion plan may be adjusted based on the updated safe zone(s) so as to ensure safe and efficient operation of the machinery.

Accordingly, in one aspect, the invention pertains to a system for safely operating machinery in a three-dimensional workspace. In various embodiments, the system includes multiple sensors (e.g., time-of-flight sensors, 3D LIDAR sensors and/or stereo vision cameras) distributed about the workspace, each of the sensors being associated with a grid of pixels for recording images of a portion of the workspace within a sensor field of view, the workspace portions partially overlapping with each other; and a controller configured to computationally generate a three-dimensional representation of the workspace as multiple 3D volumes based on the recorded images; for each of the sensors, identify volumes within a line of sight of the sensor as occupied or unoccupied; map one or more safe volumetric zones within the workspace based on the identified volumes; receive a task specification; and computationally generate a constrained motion plan including one or more trajectories of the machinery to perform the task within the safe volumetric zone(s). In one implementation, the controller is further configured to operate the machinery in accordance with the motion plan.

In various embodiments, the motion plan includes multiple trajectories of the machinery; the controller is further configured to assign a cost value to each of the trajectories; select one of the trajectories based at least in part on the assigned cost values to the trajectories; and cause the machinery to execute the selected trajectory. In one embodiment, the controller is further configured to assign the cost value to each of the trajectories based at least in part on a length of the trajectory, an operation time of the machinery on the trajectory, and/or allowed kinematics of the trajectory. In addition, the controller may be further configured to associate the safe volumetric zone(s) with a safety criterion. In one embodiment, the safety criterion corresponds to a minimum distance from a piece of the controlled machinery.

The safe volumetric zone(s) may include only the unoccupied volumes that have been classified as unoccupied based on two or more of the sensors. In some embodiments, the constrained motion plan precludes entry into a volumetric zone outside the safe volumetric zone(s) by the machinery and any workpiece associated with the machinery or the task. In addition, the controller is responsive to real-time monitoring of the workspace by the sensors and is further configured to alter the motion plan in response to a change in the safe volumetric zone(s). In various embodiments, the controller is further configured to, upon detecting an occlusion in a line-of-sight ray path, (i) classify the volumes associated with the occlusion as occupied volumes, and (ii) classify the volumes between said each of the sensors and the occupied volumes in the line-of-sight ray path as the unoccupied volumes.

In another aspect, the invention relates to a method of safely operating machinery in a three-dimensional workspace. In various embodiments, the method includes the steps of monitoring the workspace with multiple sensors (e.g., time-of-flight sensors, 3D LIDAR sensors and/or stereo vision cameras) distributed thereabout, each of the sensors being associated with a grid of pixels for recording images of a portion of the workspace within a sensor field of view, the workspace portions partially overlapping with each other; based on the recorded images, computationally generating a three-dimensional representation of the workspace as multiple 3D volumes stored in a computer memory; for each of the sensors, identifying volumes within a line of sight of the sensor as occupied or unoccupied; mapping one or more safe volumetric zones within the workspace based on the identified volumes; receiving a task specification; and computationally generating a constrained motion plan including one or more trajectories of the machinery to perform a specified task within the safe volumetric zone(s). In one implementation, the method further includes operating the machinery in accordance with the motion plan.

In various embodiments, the motion plan includes multiple trajectories of the machinery; the method further includes assigning a cost value to each of the trajectories; selecting one of the trajectories based at least in part on the assigned cost values to the trajectories; and causing the machinery to execute the selected trajectory. In one embodiment, the cost value associated with each of the trajectories is assigned based at least in part on a length of the trajectory, an operation time of the machinery on the trajectory and/or allowed kinematics of the trajectory. In addition, the method may further include associating the safe volumetric zone(s) with a safety criterion. In one embodiment, the safety criterion corresponds to a minimum distance from a piece of the controlled machinery.

The safe volumetric zone(s) may include only the unoccupied volumes that have been classified as unoccupied based on two or more of the sensors. In some embodiments, the constrained motion plan precludes entry into a volumetric zone outside the safe volumetric zone(s) by the machinery and any workpiece associated with the machinery or the task. In addition, the method further includes real-time monitoring the workspace and altering the motion plan in response to a change in the safe volumetric zone(s). The identification of the machinery element and/or workpiece may be performed using a neural network. In various embodiments, the method further includes, upon detecting an occlusion in a line-of-sight ray path, (i) classifying the volumes associated with the occlusion as occupied volumes, and (ii) classifying the volumes between said each of the sensors and the occupied volumes in the line-of-sight ray path as the unoccupied volumes.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In the following discussion, we describe an integrated system for monitoring a workspace, classifying regions therein for safety purposes, and dynamically identifying safe states. In some cases the latter function involves semantic analysis of a robot in the workspace and identification of the workpieces with which it interacts. It should be understood, however, that these various elements may be implemented separately or together in desired combinations; the inventive aspects discussed herein do not require all of the described elements, which are set forth together merely for ease of presentation and to illustrate their interoperability. The system as described represents merely one embodiment.

1. Workspace Monitoring

Figure 1:
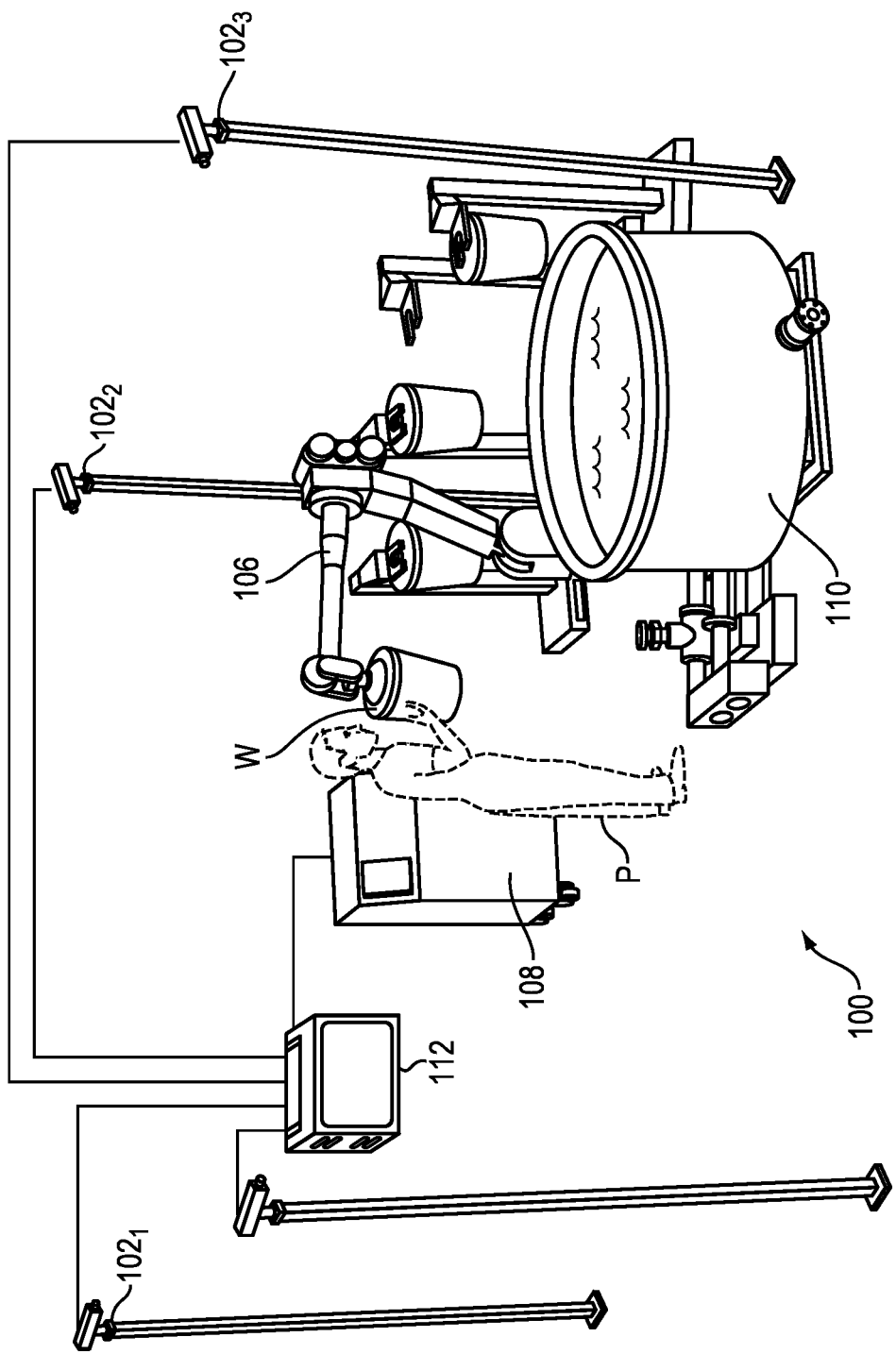
FIG. 1 is a perspective view of a monitored workspace in accordance with an embodiment of the invention.

Refer first to FIG. 1, which illustrates a representative 3D workspace 100 monitored by a plurality of sensors representatively indicated at 102₁, 102₂, 102₃. The sensors 102 may be conventional optical sensors such as cameras, e.g., 3D time-of-flight cameras, stereo vision cameras, or 3D LIDAR sensors or radar-based sensors, ideally with high frame rates (e.g., between 20 Hz and 100 Hz). The mode of operation of the sensors 102 is not critical so long as a 3D representation of the workspace 100 is obtainable from images or other data obtained by the sensors 102. As shown in the figure, sensors 102 collectively cover and can monitor the workspace 100, which includes a robot 106 controlled by a conventional robot controller 108. The robot interacts with various workpieces W, and a person P in the workspace 100 may interact with the workpieces and the robot 108. The workspace 100 may also contain various items of auxiliary equipment 110, which can complicate analysis of the workspace by occluding various portions thereof from the sensors. Indeed, any realistic arrangement of sensors will frequently be unable to "see" at least some portion of an active workspace. This is illustrated in the simplified arrangement of FIG. 1: due to the presence of the person P, at least some portion of robot controller 108 may be occluded from all sensors. In an environment that people traverse and where even stationary objects may be moved from time to time, the unobservable regions will shift and vary.

Figure 2:
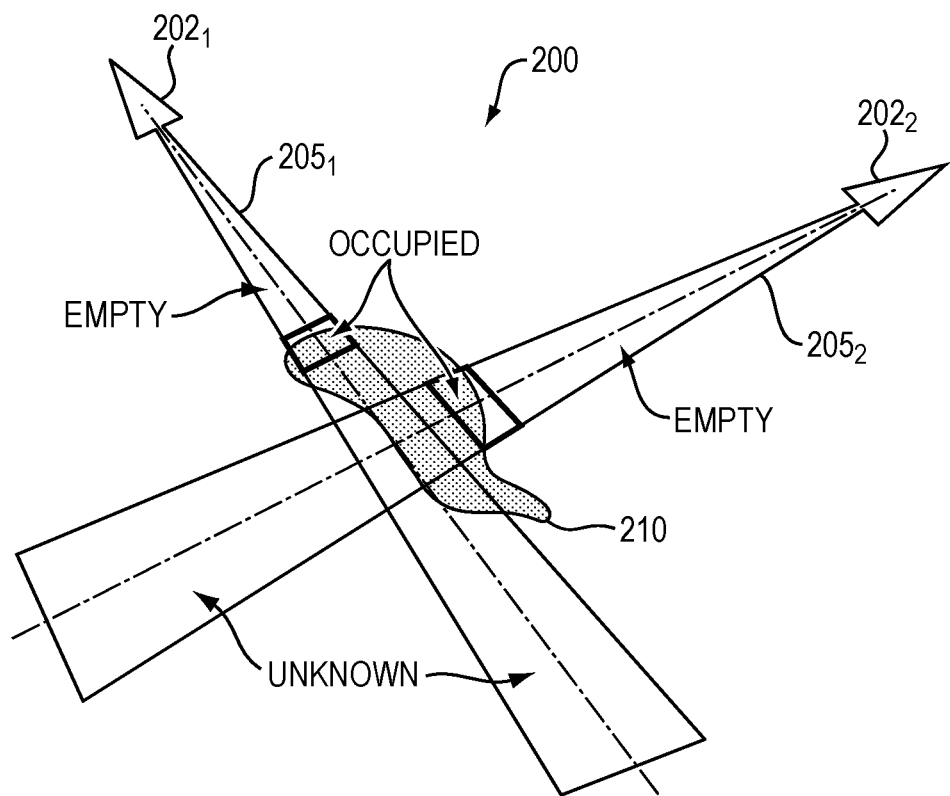
FIG. 2 schematically illustrates classification of regions within the monitored workspace in accordance with an embodiment of the invention.

As shown in FIG. 2, embodiments of the present invention classify workspace regions as occupied, unoccupied (or empty), or unknown. For ease of illustration, FIG. 2 shows two sensors 202₁, 202₂ and their zones of coverage 205₁, 205₂ within the workspace 200 in two dimensions; similarly, only the 2D footprint 210 of a 3D object is shown. The portions of the coverage zones 205 between the object boundary and the sensors 200 are marked as unoccupied, because each sensor affirmatively detects no obstructions in this intervening space. The space at the object boundary is marked as occupied. In a coverage zone 205 beyond an object boundary, all space is marked as unknown; the corresponding sensor is configured to sense occupancy in this region but, because of the intervening object 210, cannot do so.

With renewed reference to FIG. 1, data from each sensor 102 is received by a control system 112. The volume of space covered by each sensor—typically a solid cone—may be represented in any suitable fashion, e.g., the space may be divided into a 3D grid of small (5 cm, for example) cubes or "voxels" or other suitable form of volumetric representation. For example, workspace 100 may be represented using 2D or 3D ray tracing, where the intersections of the 2D or 3D rays emanating from the sensors 102 are used as the volume coordinates of the workspace 100. This ray tracing can be performed dynamically or via the use of precomputed volumes, where objects in the workspace 100 are previously identified and captured by control system 112. For convenience of presentation, the ensuing discussion assumes a voxel representation; control system 112 maintains an internal representation of the workspace 100 at the voxel level, with voxels marked as occupied, unoccupied, or unknown.

Figure 3:
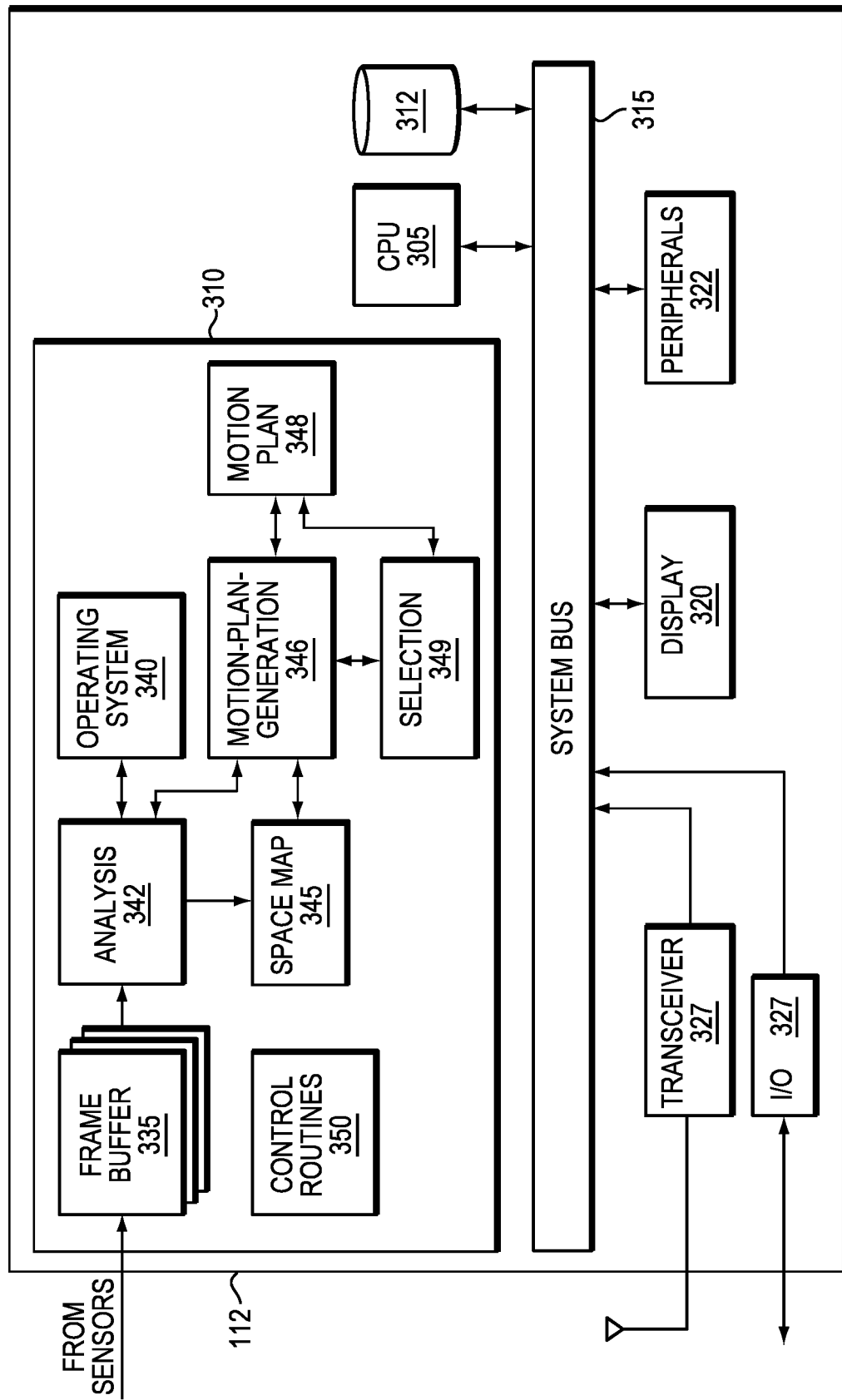
FIG. 3 schematically illustrates a control system in accordance with an embodiment of the invention.

FIG. 3 illustrates, in greater detail, a representative embodiment of control system 112, which may be implemented on a general-purpose computer or a specialized computing device (see, e.g., U.S. Patent Publication No. 2020/0272123, the entire content of which is incorporated herein by reference). The control system 112 includes a central processing unit (CPU) 305, system memory 310, and one or more non-volatile mass storage devices (such as one or more hard disks and/or optical storage units) 312. The system 112 further includes a bidirectional system bus 315 over which the CPU 305, memory 310, and storage device 312 communicate with each other as well as with internal or external input/output (I/O) devices such as a display 320 and peripherals 322, which may include traditional input devices such as a keyboard or a mouse). The control system 112 also includes a wireless transceiver 325 and one or more I/O ports 327. Transceiver 325 and I/O ports 327 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with control system 112 using a tablet that wirelessly joins the network. When used in a WAN networking environment, computers typically include a modem or other communication mechanism. Modems may be internal or external, and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), BLUETOOTH, ZigBee, IrDa, near-field communication (NFC), or other suitable protocol. Furthermore, components of the system may communicate through a combination of wired or wireless paths, and communication may involve both computer and telecommunications networks.

CPU 305 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 310 contains a series of frame buffers 335, i.e., partitions that store, in digital form (e.g., as pixels or voxels, or as depth maps), images obtained by the sensors 102; the data may actually arrive via I/O ports 327 and/or transceiver 325 as discussed above. System memory 310 contains instructions, conceptually illustrated as a group of modules, that control the operation of CPU 305 and its interaction with the other hardware components. An operating system 340 (e.g., Windows or Linux) directs the execution of low-level, basic system functions such as memory allocation, file management and operation of mass storage device 312. At a higher level, and as described in greater detail below, an analysis module 342 registers the images in frame buffers 335 and analyzes them to classify regions of the monitored workspace 100. The result of the classification may be stored in a space map 345, which contains a volumetric representation of the workspace 100 with each voxel (or other unit of representation) labeled, within the space map, as described herein. Alternatively, space map 345 may simply be a 3D array of voxels, with voxel labels being stored in a separate database (in memory 310 or in mass storage 312).

In various embodiments, a motion plan-generation module 346 receives (i) a task specification from system memory 310 or mass storage 312 and (ii) data related to the classified regions of the monitored workspace from the analysis module 342 and/or space map 345, and, based thereon, generates a constrained motion plan 348 according to which the robot 106 performs the specified task without entering the occupied or unknown volumes. The motion plan 348 may be stored in system memory 310, mass storage 312 and/or suitable hardware carried out by software executing on the control system 112. In one embodiment, the motion plan 348 includes more than one trajectory of the machinery for performing the task—i.e., all of the included trajectories can perform the task within the safety constraint(s) but involve different movement sequences. The system memory 310 further includes a selection module 349 for selecting an optimal trajectory among those identified in the motion plan. For example, selection module 349 may assign a cost value to each candidate trajectory based on, for example, the length of the trajectory, the operating time required for the machinery to execute the trajectory, or kinematic limitations on robot motion that make particular trajectories more difficult to execute. The selection module 349 may then select the optimal trajectory based on the cost value (e.g., the minimum cost corresponding to the shortest trajectory length, shortest operating time, or the lowest value of a metric capturing the kinematic limitations), thereby ensuring efficient and safe operation of the machinery.

Control system 112 may also control the operation or machinery in the workspace 100 using conventional control routines collectively indicated at 350. In one embodiment, the control routines are based on the generated motion plan 348 (and/or the selected trajectory of the motion plan). As explained below, the configuration of the workspace and, consequently, the classifications associated with its voxel representation may well change over time as persons and/or machines move about, and control routines 350 may be responsive to these changes in operating machinery to achieve high levels of safety. All of the modules in system memory 310 may be programmed in any suitable programming language, including, without limitation, high-level languages such as C, C++, C #, Ada, Basic, Cobra, Fortran, Java, Lisp, Perl, Python, Ruby, or low-level assembly languages.

1.1 Sensor Registration

In a typical multi-sensor system, the precise location of each sensor 102 with respect to all other sensors is established during setup. Sensor registration is usually performed automatically, and should be as simple as possible to allow for ease of setup and reconfiguration. Assuming for simplicity that each frame buffer 335 stores an image (which may be refreshed periodically) from a particular sensor 102, analysis module 342 may register sensors 102 by comparing all or part of the image from each sensor to the images from other sensors in frame buffers 335, and using conventional computer-vision techniques to identify correspondences in those images. Suitable global-registration algorithms, which do not require an initial registration approximation, generally fall into two categories: feature-based methods and intensity-based methods. Feature-based methods identify correspondences between image features such as edges while intensity-based methods use correlation metrics between intensity patterns. Once an approximate registration is identified, an Iterative Closest Point (ICP) algorithm or suitable variant thereof may be used to fine-tune the registration.

If there is sufficient overlap between the fields of view of the various sensors 102, and sufficient detail in the workspace 100 to provide distinct sensor images, it may be sufficient to compare images of the static workspace. If this is not the case, a "registration object" having a distinctive signature in 3D can be placed in a location within workspace 100 where it can be seen by all sensors. Alternatively, registration can be achieved by having the sensors 102 record images of one or more people standing in the workspace or walking throughout the workspace over a period of time, combining a sufficient number of partially matching images until accurate registration is achieved.

Registration to machinery within the workspace 100 can, in some cases, be achieved without any additional instrumentation, especially if the machinery has a distinctive 3D shape (for example, a robot arm), so long as the machinery is visible to at least one sensor registered with respect to the others. Alternatively, a registration object can be used, or a user interface, shown in display 320 and displaying the scene observed by the sensors, may allow a user to designate certain parts of the image as key elements of the machinery under control. In some embodiments, the interface provides an interactive 3D display that shows the coverage of all sensors to aid in configuration. If the system is be configured with some degree of high-level information about the machinery being controlled (for purposes of control routines 350, for example)—such as the location(s) of dangerous part or parts of the machinery and the stopping time and/or distance—analysis module 342 may be configured to provide intelligent feedback as to whether the sensors are providing sufficient coverage, and suggest placement for additional sensors.

For example, analysis module 342 can be programmed to determine the minimum distance from the observed machinery at which it must detect a person in order to stop the machinery by the time the person reaches it (or a safety zone around it), given conservative estimates of walking speed. (Alternatively, the required detection distance can be input directly into the system via display 320.) Optionally, analysis module 342 can then analyze the fields of view of all sensors to determine whether the space is sufficiently covered to detect all approaches. If the sensor coverage is insufficient, analysis module 342 can propose new locations for existing sensors, or locations for additional sensors, that would remedy the deficiency. Otherwise, the control system will default to a safe state and control routines 350 will not permit machinery to operate unless analysis module 342 verifies that all approaches can be monitored effectively. Use of machine learning and genetic or evolutionary algorithms can be used to determine optimal sensor placement within a cell. Parameters to optimize include but are not limited to minimizing occlusions around the robot during operation and observability of the robot and workpieces.

If desired, this static analysis may include "background" subtraction. During an initial startup period, when it may be safely assumed there are no objects intruding into the workspace 100, analysis module 342 identifies all voxels occupied by the static elements. Those elements can then be subtracted from future measurements and not considered as potential intruding objects. Nonetheless, continuous monitoring is performed to ensure that the observed background image is consistent with the space map 345 stored during the startup period. Background can also be updated if stationary objects are removed or are added to the workspace.

There may be some areas that sensors 102 cannot observe sufficiently to provide safety, but that are guarded by other methods such as cages, etc. In this case, the user interface can allow the user to designate these areas as safe, overriding the sensor-based safety analysis. Safety-rated soft-axis and rate limitations can also be used to limit the envelope of the robot to improve performance of the system.

Once registration has been achieved, sensors 102 should remain in the same location and orientation while the workspace 100 is monitored. If one or more sensors 102 are accidentally moved, the resulting control outputs will be invalid and could result in a safety hazard. Analysis module 342 may extend the algorithms used for initial registration to monitor continued accuracy of registration. For example, during initial registration analysis module 342 may compute a metric capturing the accuracy of fit of the observed data to a model of the work cell static elements that is captured during the registration process. As the system operates, the same metric can be recalculated. If at any time that metric exceeds a specified threshold, the registration is considered to be invalid and an error condition is triggered; in response, if any machinery is operating, a control routine 350 may halt it or transition the machinery to a safe state.

1.2 Identifying Occupied and Potentially Occupied Areas

Once the sensors have been registered, control system 112 periodically updates space map 345—at a high fixed frequency (e.g., every analysis cycle) in order to be able to identify all intrusions into workspace 100. Space map 345 reflects a fusion of data from some or all of the sensors 102. But given the nature of 3D data, depending on the locations of the sensors 102 and the configuration of workspace 100, it is possible that an object in one location will occlude the sensor's view of objects in other locations, including objects (which may include people or parts of people, e.g. arms) that are closer to the dangerous machinery than the occluding object. Therefore, to provide a reliably safe system, the system monitors occluded space as well as occupied space.

In one embodiment, space map 345 is a voxel grid. In general, each voxel may be marked as occupied, unoccupied or unknown; only empty space can ultimately be considered safe, and only when any additional safety criteria—e.g., minimum distance from a piece of controlled machinery—is satisfied. Raw data from each sensor is analyzed to determine whether, for each voxel, an object or boundary of the 3D mapped space has been definitively detected in the volume corresponding to that voxel. To enhance safety, analysis module 342 may designate as empty only voxels that are observed to be empty by more than one sensor 102. Again, all space that cannot be confirmed as empty is marked as unknown. Thus, only space between a sensor 102 and a detected object or mapped 3D space boundary along a ray may be marked as empty.

If a sensor detects anything in a given voxel, all voxels that lie on the ray beginning at the focal point of that sensor and passing through the occupied voxel, and which are between the focal point and the occupied voxel, are classified as unoccupied, while all voxels that lie beyond the occupied voxel on that ray are classified as occluded for that sensor; all such occluded voxels are considered "unknown." Information from all sensors may be combined to determine which areas are occluded from all sensors; these areas are considered unknown and therefore unsafe. Analysis module 342 may finally mark as "unoccupied" only voxels or workspace volumes that have been preliminarily marked at least once (or, in some embodiments, at least twice) as "unoccupied." Based on the markings associated with the voxels or discrete volumes within the workspace, analysis module 342 may map one or more safe volumetric zones within space map 345. These safe zones are outside a safety zone of the machinery and include only voxels or workspace volumes marked as unoccupied.

A common failure mode of active optical sensors that depend on reflection, such as LIDAR and time-of-flight cameras, is that they do not return any signal from surfaces that are insufficiently reflective, and/or when the angle of incidence between the sensor and the surface is too shallow. This can lead to a dangerous failure because this signal can be indistinguishable from the result that is returned if no obstacle is encountered; the sensor, in other words, will report an empty voxel despite the possible presence of an obstacle. This is why ISO standards for e.g. 2D LIDAR sensors have specifications for the minimum reflectivity of objects that must be detected; however, these reflectivity standards can be difficult to meet for some 3D sensor modalities such as ToF. In order to mitigate this failure mode, analysis module 342 marks space as empty only if some obstacle is definitively detected at further range along the same ray. By pointing sensors slightly downward so that most of the rays will encounter the floor if no obstacles are present, it is possible to conclusively analyze most of the workspace 100. But if the sensed light level in a given voxel is insufficient to definitively establish emptiness or the presence of a boundary, the voxel is marked as unknown. The signal and threshold value may depend on the type of sensor being used. In the case of an intensity-based 3D sensor (for example, a time-of-flight camera) the threshold value can be a signal intensity, which may be attenuated by objects in the workspace of low reflectivity. In the case of a stereo vision system, the threshold may be the ability to resolve individual objects in the field of view. Other signal and threshold value combinations can be utilized depending on the type of sensor used.

A safe system can be created by treating all unknown space as though it were occupied. However, in some cases this may be overly conservative and result in poor performance. It is therefore desirable to further classify unknown space according to whether it could potentially be occupied. As a person moves within a 3D space, he or she will typically occlude some areas from some sensors, resulting in areas of space that are temporarily unknown (see FIG. 1). Additionally, moving machinery such as an industrial robot arm can also temporarily occlude some areas. When the person or machinery moves to a different location, one or more sensors will once again be able to observe the unknown space and return it to the confirmed-empty state in which it is safe for the robot or machine to operate. Accordingly, in some embodiments, space may also be classified as "potentially occupied." Unknown space is considered potentially occupied when a condition arises where unknown space could be occupied. This could occur when unknown space is adjacent to entry points to the workspace or if unknown space is adjacent to occupied or potentially occupied space. The potentially occupied space "infects" unknown space at a rate that is representative of a human moving through the workspace. Potentially occupied space stays potentially occupied until it is observed to be empty. For safety purposes, potentially occupied space is treated the same as occupied space. It may be desirable to use probabilistic techniques such as those based on Bayesian filtering to determine the state of each voxel, allowing the system to combine data from multiple samples to provide higher levels of confidence in the results. Suitable models of human movement, including predicted speeds (e.g., an arm may be raised faster than a person can walk), are readily available.

2. Classifying Objects

For many applications, the classification of regions in a workspace as described above may be sufficient—e.g., if control system 112 is monitoring space in which there should be no objects at all during normal operation. In many cases, however, it is desirable to monitor an area in which there are at least some objects during normal operation, such as one or more machines and workpieces on which the machine is operating. In these cases, analysis module 342 may be configured to identify intruding objects that are unexpected or that may be humans. One suitable approach to such classification is to cluster individual occupied voxels into objects that can be analyzed at a higher level.

To achieve this, analysis module 342 may implement any of several conventional, well-known clustering techniques such as Euclidean clustering, K-means clustering and Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be useful in various ways.

One simple way clustering can be used is to eliminate small groups of occupied or potentially occupied voxels that are too small to possibly contain a person. Such small clusters may arise from occupation and occlusion analysis, as described above, and can otherwise cause control system 112 to incorrectly identify a hazard. Clusters can be tracked over time by simply associating identified clusters in each image frame with nearby clusters in previous frames or using more sophisticated image-processing techniques. The shape, size, or other features of a cluster can be identified and tracked from one frame to the next. Such features can be used to confirm associations between clusters from frame to frame, or to identify the motion of a cluster. This information can be used to enhance or enable some of the classification techniques described below. Additionally, tracking clusters of points can be employed to identify incorrect and thus potentially hazardous situations. For example, a cluster that was not present in previous frames and is not close to a known border of the field of view may indicate an error condition.

In some cases it may be sufficient to filter out clusters below a certain size and to identify cluster transitions that indicate error states. In other cases, however, it may be necessary to further classify objects into one or more of four categories: (1) elements of the machinery being controlled by system 112, (2) the workpiece or workpieces that the machinery is operating on, and (3) other foreign objects, including people, that may be moving in unpredictable ways and that can be harmed by the machinery. It may or may not be necessary to conclusively classify people versus other unknown foreign objects. It may be necessary to definitively identify elements of the machinery as such, because by definition these will always be in a state of "collision" with the machinery itself and thus will cause the system to erroneously stop the machinery if detected and not properly classified. Similarly, machinery typically comes into contact with workpieces, but it is typically hazardous for machinery to come into contact with people. Therefore, analysis module 342 should be able to distinguish between workpieces and unknown foreign objects, especially people.

Elements of the machinery itself may be handled for classification purposes by the optional background-subtraction calibration step described above. In cases where the machinery changes shape, elements of the machinery can be identified and classified, e.g., by supplying analysis module 342 with information about these elements (e.g., as scalable 3D representations), and in some cases (such as industrial robot arms) providing a source of instantaneous information about the state of the machinery. Analysis module 342 may be "trained" by operating machinery, conveyors, etc. in isolation under observation by the sensors 102, allowing analysis module 342 to learn their precise regions of operation resulting from execution of the full repertoire of motions and poses. Analysis module 342 may classify the resulting spatial regions as occupied.

Conventional computer-vision techniques may be employed to enable analysis module 342 to distinguish between workpieces and humans. These include deep learning, a branch of machine learning designed to use higher levels of abstraction in data. The most successful of these deep-learning algorithms have been convolutional neural networks (CNNs) and more recently recurrent neural networks (RNNs). However, such techniques are generally employed in situations where accidental misidentification of a human as a non-human does not cause safety hazards. In order to use such techniques in the present environment, a number of modifications may be needed. First, machine-learning algorithms can generally be tuned to prefer false positives or false negatives (for example, logistic regression can be tuned for high specificity and low sensitivity). False positives in this scenario do not create a safety hazard—if the robot mistakes a workpiece for a human, it will react conservatively. Additionally, multiple algorithms or neural networks based on different image properties can be used, promoting the diversity that may be key to achieving sufficient reliability for safety ratings. One particularly valuable source of diversity can be obtained by using sensors that provide both 3D and 2D image data of the same object. If any one technique identifies an object as human, the object will be treated as human. Using multiple techniques or machine-learning algorithms, all tuned to favor false positives over false negatives, sufficient reliability can be achieved. In addition, multiple images can be tracked over time, further enhancing reliability—and again every object can be treated as human until enough identifications have characterized it as non-human to achieve reliability metrics. Essentially, this diverse algorithmic approach, rather than identifying humans, identifies things that are definitely not humans.

In addition to combining classification techniques, it is possible to identify workpieces in ways that do not rely on any type of human classification at all. One approach is to configure the system by providing models of workpieces. For example, a "teaching" step in system configuration may simply supply images or key features of a workpiece to analysis module 342, which searches for matching configurations in space map 345, or may instead involve training of a neural network to automatically classify workpieces as such in the space map. In either case, only objects that accurately match the stored model are treated as workpieces, while all other objects are treated as humans.

Another suitable approach is to specify particular regions within the workspace, as represented in the space map 345, where workpieces will enter (such as the top of a conveyor belt). Only objects that enter the workspace in that location are eligible for treatment as workpieces. The workpieces can then be modeled and tracked from the time they enter the workspace until the time they leave. While a monitored machine such as a robot is handling a workpiece, control system 112 ensures that the workpiece is moving only in a manner consistent with the expected motion of the robot end effector. Known equipment such as conveyor belts can also be modeled in this manner. Humans may be forbidden from entering the work cell in the manner of a workpiece—e.g., sitting on conveyors.

All of these techniques can be used separately or in combination, depending on design requirements and environmental constraints. In all cases, however, there may be situations where analysis module 342 loses track of whether an identified object is a workpiece. In these situations the system should fall back to a safe state. An interlock can then be placed in a safe area of the workspace where a human worker can confirm that no foreign objects are present, allowing the system to resume operation.

In some situations a foreign object enters the workspace, but subsequently should be ignored or treated as a workpiece. For example, a stack of boxes that was not present in the workspace at configuration time may subsequently be placed therein. This type of situation, which will become more common as flexible systems replace fixed guarding, may be addressed by providing a user interface (e.g., shown in display 320 or on a device in wireless communication with control system 112) that allows a human worker to designate the new object as safe for future interaction. Of course, analysis module 342 and control routines 350 may still act to prevent the machinery from colliding with the new object, but the new object will not be treated as a potentially human object that could move towards the machinery, thus allowing the system to handle it in a less conservative manner.

3. Generating a Constrained Motion Plan of Machinery

Figure 4A:
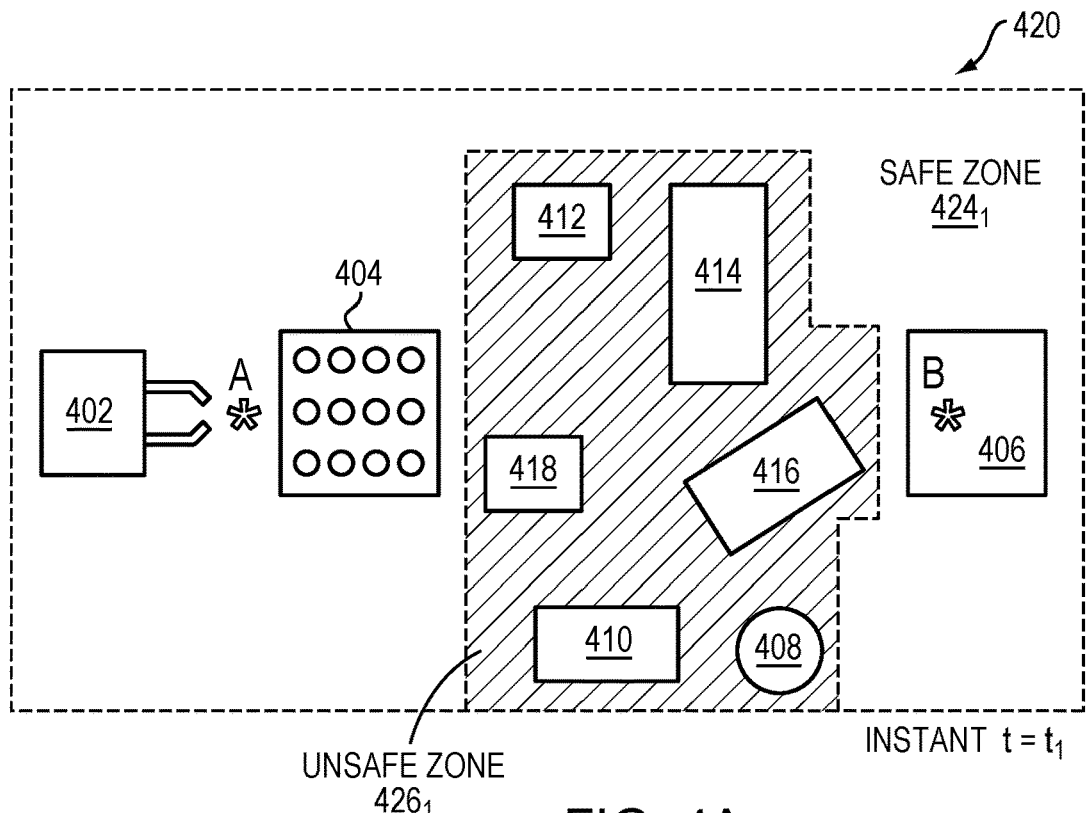
FIGS. 4A-4C schematically illustrate dynamically defined safe zones and unsafe zones in a workspace at three instants of a task in accordance with an embodiment of the invention.
Figure 4B:
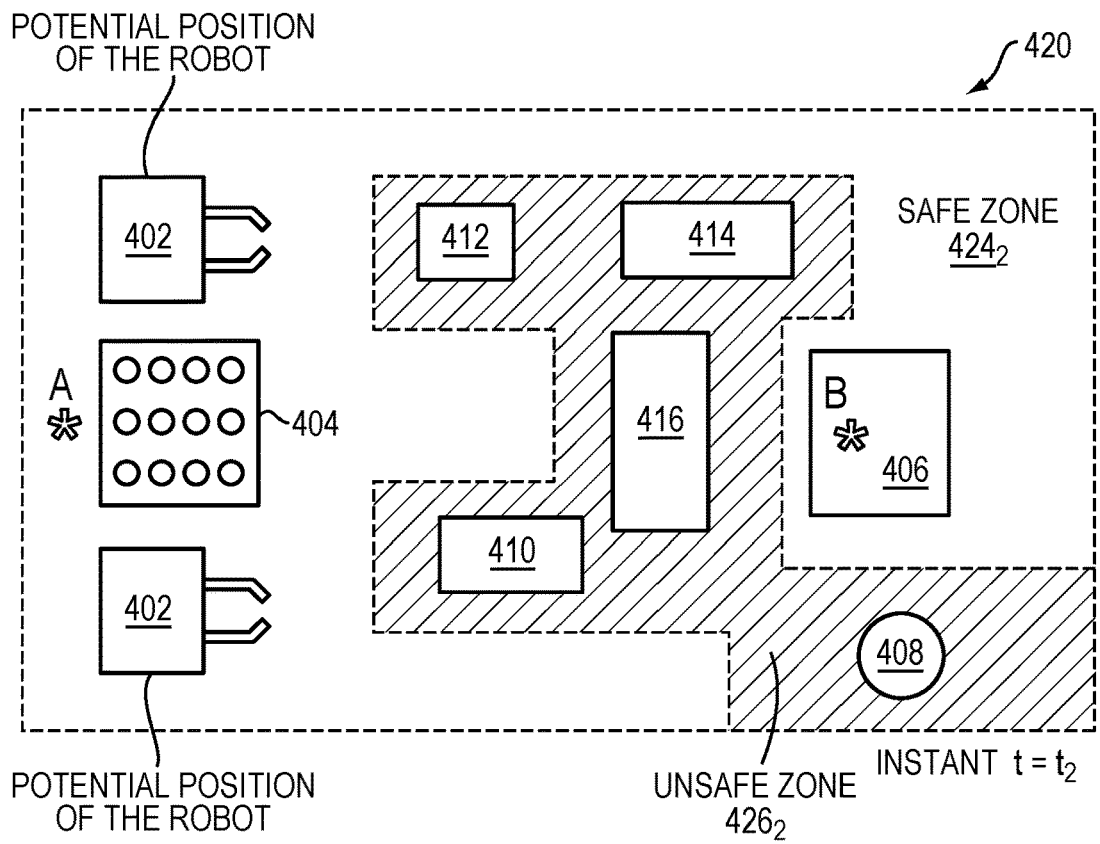
Figure 4C:
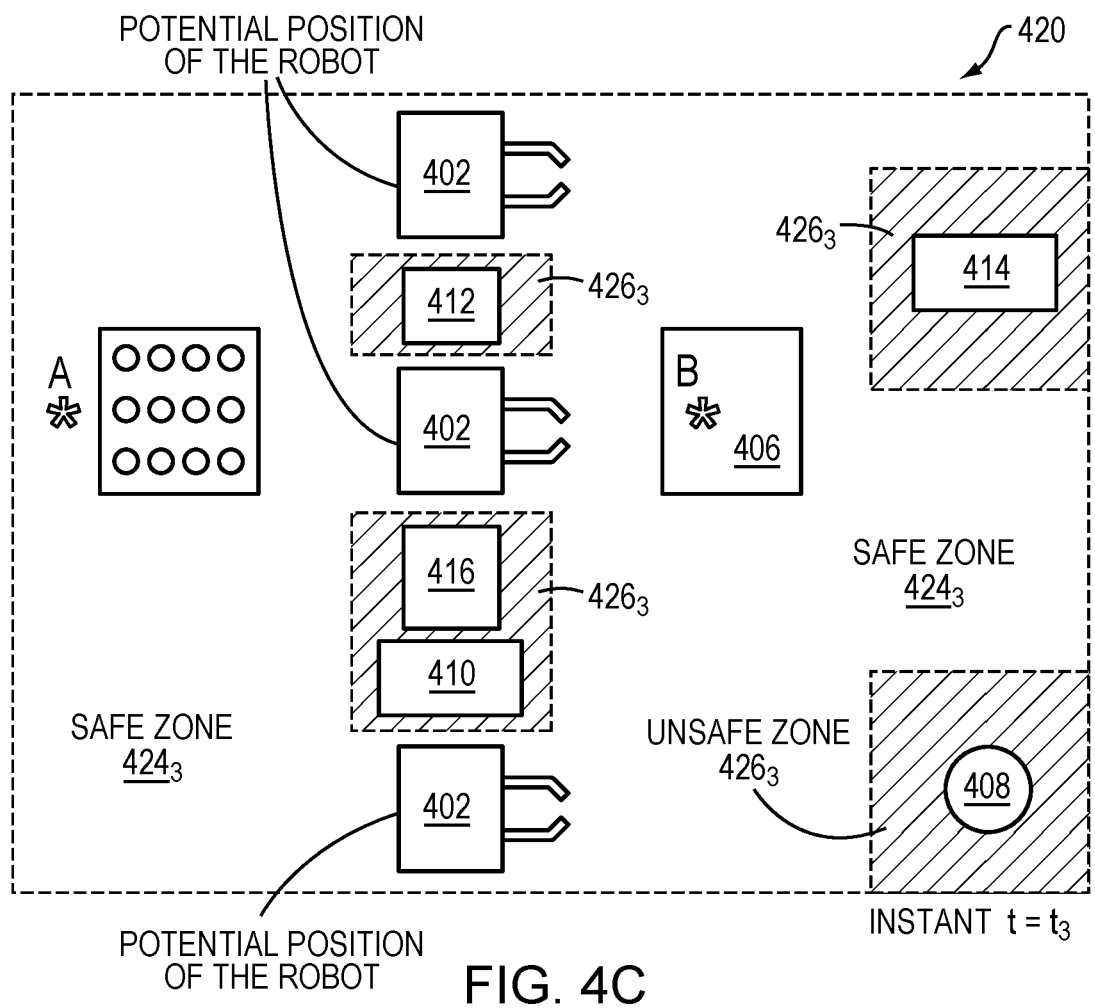
Figure 4D:
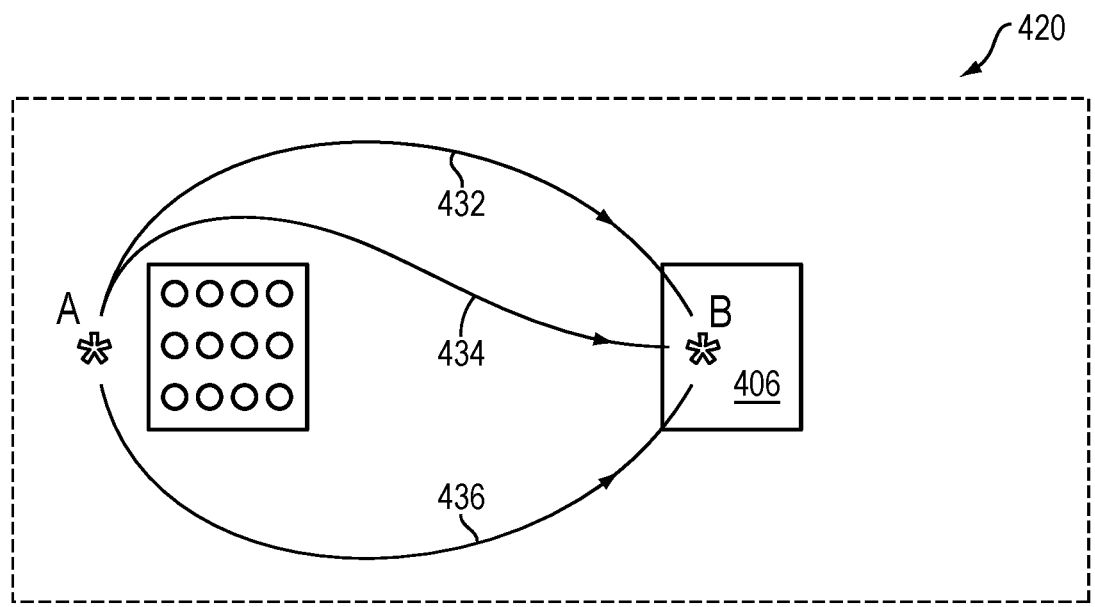
FIG. 4D schematically depicts a constrained motion plan in accordance with an embodiment of the invention.

At this stage, analysis module 342 has identified all objects in the monitored area 100 that must be considered for safety purposes. A constrained motion plan may now be generated for the machinery to perform a task or portion thereof without collision or violation of speed-and-separation monitoring (SSM) requirements as defined by the ISO 10218 and ISO/TS 15066 standards. For example, with reference to FIGS. 4A-4C, assuming the robot 402 is required to move from point A, in front of the parts bin 404, to point B, at the assembly table 406, in executing a task, based on the task specification and the identified human operator 408 (which can be multiple humans around the monitored space 420) and objects 410-416 in the monitored space 420, analysis module 342 may classify space in the workspace 420 into safe zones (e.g., corresponding to unoccupied space) $424_{1-3}$ and unsafe zones (e.g., corresponding to occupied and/or unknown space) $426_{1-3}$ at three instants, $t_{1-3}$, respectively, during execution of the task. Referring to FIG. 4D, based on the mapped safe and unsafe zones, the motion plan-generation module 346 generates a constrained motion plan for the robot 106 including three trajectories 432-436 and/or one or more states (e.g., orientations, velocities, etc.) to perform the task without entering the unsafe zones $426_{1-3}$ in any of the instances.

Because a motion plan 348 may include multiple trajectories, selection module 349 selects the optimal trajectory among those available in the motion plan. For example, selection module 349 may assign a cost value to each trajectory based on, for example, the path length of the trajectory and/or the time it will take robot 106 to traverse it, as well as any other quantifiable benefits or disadvantages to each of the paths (e.g., the desirability to keeping some areas of the workspace clear when possible, the proximity each path to entry points that increase the likelihood that a trajectory may become unsafe due to entry of a human, etc.). Based on the assigned cost value, selection module 349 selects the optimal trajectory (e.g., having the minimum cost value), thereby ensuring efficient operation of the machinery. Subsequently, robot 106 can be operated based on the selected trajectory in the constrained motion plan as further described below.

Figure 5A:
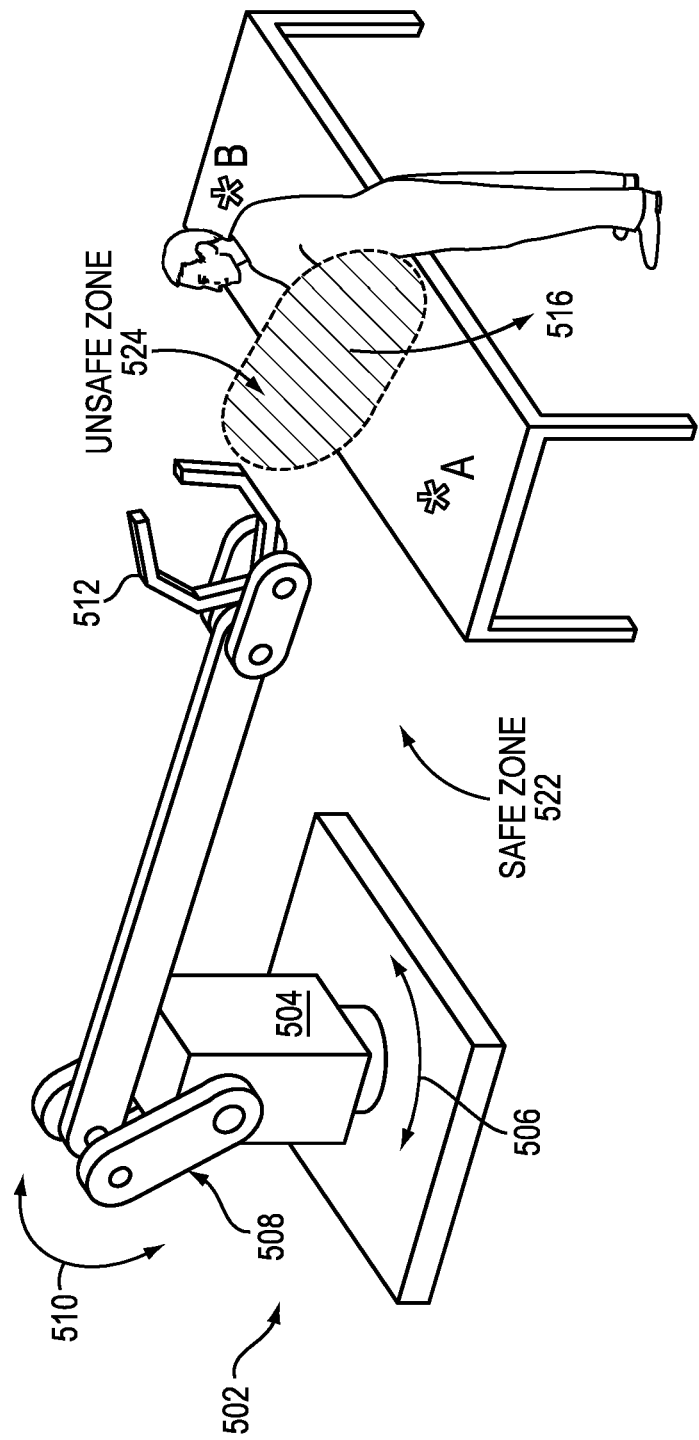
FIG. 5A schematically illustrates dynamically defined safe zones and unsafe zones in a workspace having a six-axis robot in accordance with an embodiment of the invention.
Figure 5B:
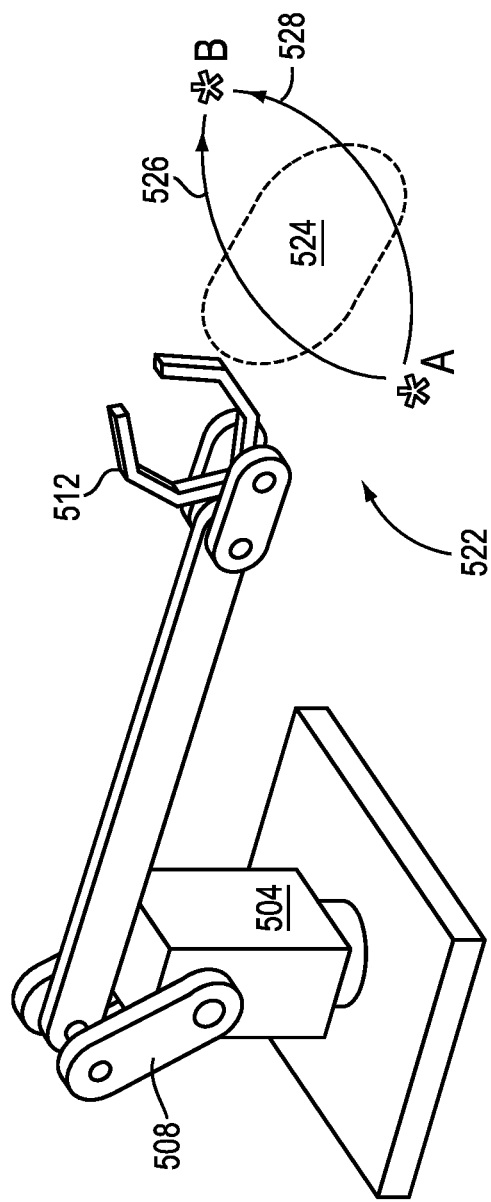
FIG. 5B schematically depicts a constrained motion plan in accordance with an embodiment of the invention.

The approach described above may be implemented to generate and/or execute a constrained motion plan for part of the machinery, such as a robotic arm. Here the motion plan-generation module 346 may take joint kinematics and physical constraints into account when generating the motion plan. FIG. 5A depicts a six-axis articulated robot 502; each joint of the robot 502 has its corresponding constrained kinematics. For example, the base joint 504 can only turn along its axis perpendicular to the floor (i.e., in the direction 506); similarly, the joint 508 physically anchored to the base joint 504 may only move by rotating around a single axis (in the direction 510) and have a pose in space constrained by the base joint's rotation; and so on. Assuming the robot's appendage 512 is required to move an object from point A to point B in executing a task, based on the task specification and an identified operator's arm 516 in the space monitored by the sensor system 102, analysis module 342 may classify space in the workspace into safe zones 522 and unsafe zones 524 during execution of the task. With reference to FIG. based on the mapped safe and unsafe zones, the motion plan-generation module 346 generates a constrained motion plan including two trajectories 526, 528 for performing the task without entering the unsafe zones 524 and risking collision with the operator's arm 516.

To identify the optimal trajectory for the robot 502, selection module 349 may assign a cost value to each trajectory based on, for example, the path length of the trajectory, the time it will take the robot 502 to traverse it, allowed or physically possible joint kinematics through the trajectory, as well as any other quantifiable benefits or disadvantages to each of the paths. Again, based on the assigned cost value, selection module 349 selects the optimal trajectory (e.g., having the minimum cost value) and the robot can be operated based on the selected trajectory.

4. Generating Control Outputs

Once analysis module 342 has identified all objects in the monitored area 100 that must be considered for safety purposes and/or motion plan-generation module 346 has generated a constrained motion plan, a variety of actions can be taken and control outputs generated. For example, during static calibration or with the workspace in a default configuration free of humans, space map 345 may be useful to a human for evaluating sensor coverage, the configuration of deployed machinery, and opportunities for unwanted interaction between humans and machines. Even without setting up cages or fixed guards, the overall workspace layout may be improved by channeling or encouraging human movement through the regions marked as safe zones, as described above, and away from regions with poor sensor coverage.

Control routines 350, responsive to analysis module 342, may generate control signals to operating machinery, such as robots, within workspace 100 when certain conditions are detected. This control can be binary, indicating either safe or unsafe conditions, or can be more complex, such as an indication of what actions are safe and unsafe. The simplest type of control signal is a binary signal indicating whether an intrusion of either occupied or potentially occupied volume is detected in a particular zone. In the simplest case, there is a single intrusion zone and control system 112 provides a single output indicative of an intrusion. This output can be delivered, for example, via an I/O port 327 to a complementary port on the controlled machinery to stop or limit the operation of the machinery. In more complex scenarios, multiple zones are monitored separately, and a control routine 350 issues a digital output via an I/O port 327 or transceiver 325 addressed, over a network, to a target piece of machinery (e.g., using the Internet protocol or other suitable addressing scheme).

During robot operation, control routines 350 generate control signals to execute a task following selection of a task-execution trajectory by selection module 349. In particular, control routines 350 generate and deliver an output signal via, for example, the transceiver 325 and/or I/O port 327 to operate the machinery in accordance with the selected trajectory. As explained in greater detail below, the configuration of the safe zones around which the trajectory was planned may change during task execution—for example, a human may intrude into or close to a portion of the trajectory. Therefore, as noted, one element of the attributed cost of a trajectory may be the probability of a change in the safe-zone configuration required for the trajectory—e.g., the relative likelihood among trajectories that a human will appear and alter the safe zone.

Another condition that may be monitored is the distance between any object in the workspace and a machine, comparable to the output of a 2D proximity sensor. This may be converted into a binary output by establishing a proximity threshold below which the output should be asserted. It may also be desirable for the system to record and make available the location and extent of the object closest to the machine. In other applications, such as a safety system for a collaborative industrial robot, the desired control output may include the location, shape, and extent of all objects observed within the area covered by the sensors 102.

5. Safe Action Constraints and Dynamic Determination of Safe Zones

ISO 10218 and ISO/TS 15066 describe speed and separation monitoring as a safety function that can enable collaboration between an industrial robot and a human worker. Risk reduction is achieved by maintaining at least a protective separation distance between the human worker and robot during periods of robot motion. This protective separation distance is calculated using information including robot and human worker position and movement, robot stopping distance, measurement uncertainty, system latency and system control frequency. When the calculated separation distance decreases to a value below the protective separation distance, the robot system is slowed down or stopped. This methodology can be generalized beyond industrial robotics to machinery.

For convenience, the following discussion focuses on dynamically defining a safe zone around a robot operating in the workspace 100. It should be understood, however, that the techniques described herein apply not only to multiple robots but to any form of machinery that can be dangerous when approached too closely, and which has a minimum safe separation distance that may vary over time and with particular activities undertaken by the machine. As described above, a sensor array obtains sufficient image information to characterize, in 3D, the robot and the location and extent of all relevant objects in the area surrounding the robot at each analysis cycle. (Each analysis cycle includes image capture, refresh of the frame buffers, and computational analysis; accordingly, although the period of the analysis or control cycle is short enough for effective monitoring to occur in real time, it involves many computer clock cycles.) Analysis module 342 utilizes this information along with instantaneous information about the current state of the robot at each cycle to determine instantaneous, current safe action constraints for the robot's motion. The constraints may be communicated to the robot, either directly by analysis module 342 or via a control routine 350, to the robot via transceiver 325 or and I/O port 327.

Additionally, motion plan-generation module 346 may be responsive to real-time monitoring of the workspace and alter the motion plan in response to a change in the defined safe zone. For example, analysis module 342 frequently updates the defined safe zone based on the data acquired by the sensor array. Motion plan-generation module 346 may receive the updated safe zone definition from the analysis module 342 (or, in some embodiments, the space map 345) as it is generated and, based thereon, adjust the motion plan such that the machinery will not enter the updated unsafe zone. Again, if the updated motion plan includes multiple trajectories of the machinery and the task has not yet been started, selection module 349 may update the cost values assigned thereto and select the optimal trajectory based on the updated cost values so as to ensure efficient operation of the machinery. If the task is in progress, multiple actions are possible. If the robot 106 is well into the task or if the configuration of the safe zone is changing rapidly, control routines 350 may simply stop the robot and wait for a short period in case the disruption is momentary. If nothing has changed by the end of this period, the motion plan-generation module 346 may re-execute and attempt to generate viable task-completion trajectories, each having an associated cost as before, that are consistent with the reconfigured safe zone. If motion plan-generation module 346 succeeds, the least-cost trajectory is selected and executed as discussed above. If not, robot 106 may remain in place or, if possible consistent with the new safe zone, return to position and pose at the beginning of task execution. If task execution has just begun, control routines 350 may immediately reset the robot 106 to the pre-task position and pose, and determine whether the task can be completed once the new safe zone has been stable for a threshold time period, e.g., a few seconds.

Figure 6:
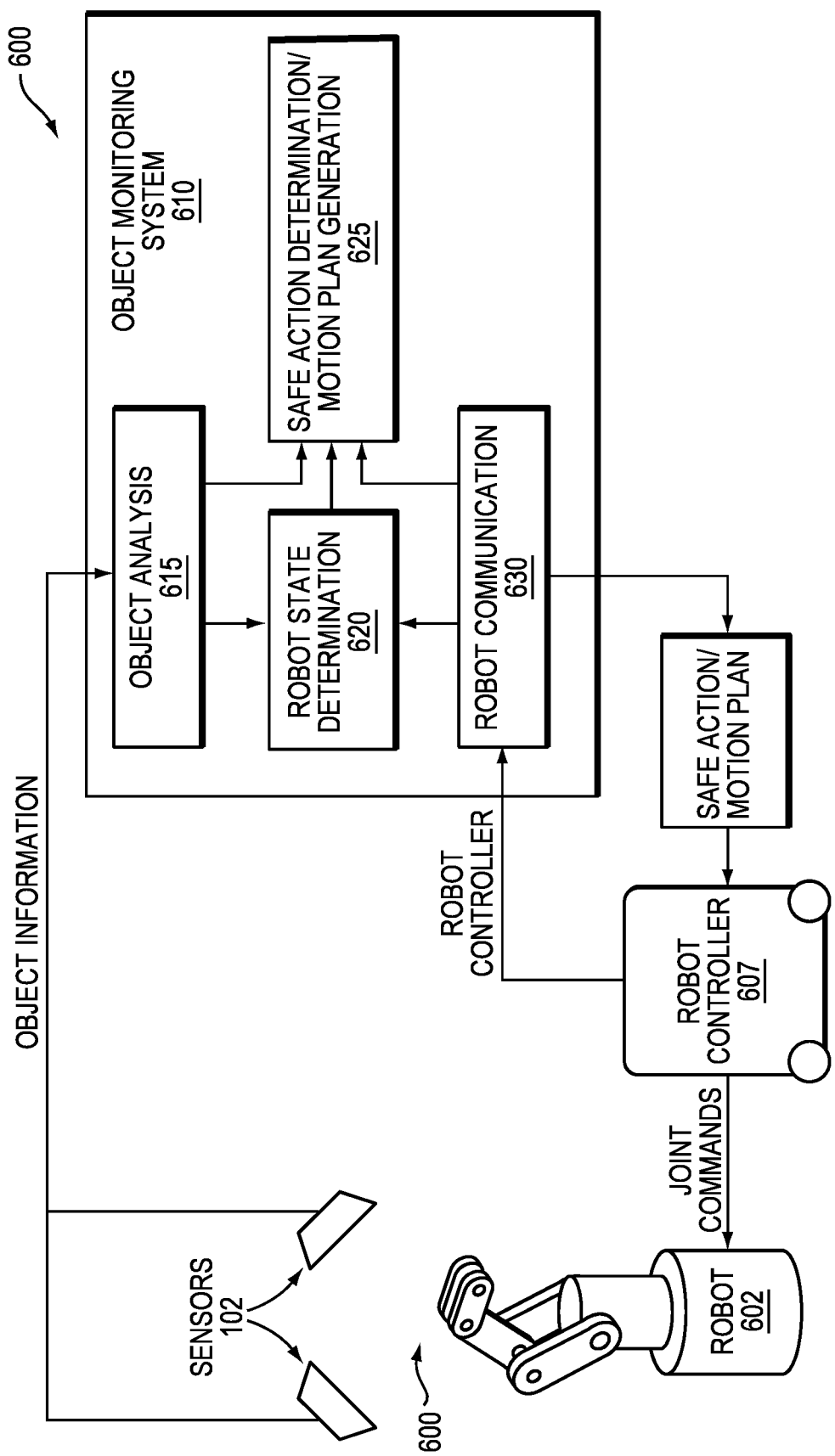
FIG. 6 schematically illustrates an object-monitoring system in accordance with an embodiment of the invention.

The operation of the system is best understood with reference to the conceptual illustration of system organization and operation of FIG. 6. As described above, a sensor array 102 monitors the workspace 600, which includes a robot 602. The robot's movements are controlled by a conventional robot controller 607, which may be part of or separate from the robot itself; for example, a single robot controller may issue commands to more than one robot. The robot's activities may primarily involve a robot arm, the movements of which are orchestrated by robot controller 607 using joint commands that operate the robot arm joints to effect a desired movement. An object-monitoring system (OMS) 610 obtains information about objects from the sensors 102 and uses this sensor information to identify relevant objects in the workspace 600. OMS 610 communicates with robot controller 607 via any suitable wired or wireless protocol. (In an industrial robot, control electronics typically reside in an external control box. However, in the case of a robot with a built-in controller, OMS 610 communicates directly with the robot's onboard controller.) Using information obtained from the robot (and, typically, sensors 102), OMS 610 determines the robot's current state. OMS 610 thereupon determines safe-action constraints, the constrained motion plan and/or the optimal trajectory for robot 602 given the robot's current state and all identified relevant objects. Finally, OMS 610 communicates the safe action constraints, constrained motion plan and/or optimal trajectory to robot 607. (It will be appreciated that, with reference to FIG. 3, the functions of OMS 610 are performed in a control system 112 by analysis module 342, motion-plan-generation module 346, and selection module 349 and, in some cases, a control routine 350)

5.1 Identifying Relevant Objects

The sensors 102 provide real-time image information that is analyzed by an object-analysis module 615 at a fixed frequency in the manner discussed above; in particular, at each cycle, object analysis module 615 identifies the precise 3D location and extent of all objects in workspace 600 that are either within the robot's reach or that could move into the robot's reach at conservative expected velocities. If not all of the relevant volume is within the collective field of view of the sensors 102, OMS 610 may be configured to so determine and indicate the location and extent of all fixed objects within that region (or a conservative superset of those objects) and/or verify that other guarding techniques have been used to prevent access to unmonitored areas.

5.2 Determining Robot State

A robot state determination module (RSDM) 620 is responsive to data from sensors 102 and signals from the robot 602 and/or robot controller 607 to determine the instantaneous state of the robot. In particular, RSDM 620 determines the pose and location of robot 602 within workspace 600; this may be achieved using sensors 102, signals from the robot and/or its controller, or data from some combination of these sources. RSDM 620 may also determine the instantaneous velocity of robot 602 or any appendage thereof; in addition, knowledge of the robot's instantaneous joint accelerations or torques, or planned future trajectory may be needed in order to determine safe motion constraints for the subsequent cycle as described below. Typically, this information comes from robot controller 607, but in some cases may be inferred directly from images recorded by sensors 102 as described below.

For example, these data could be provided by the robot 602 or the robot controller 607 via a safety-rated communication protocol providing access to safety-rated data. The 3D pose of the robot may then be determined by combining provided joint positions with a static 3D model of each link to obtain the 3D shape of the entire robot 602.

In some cases, the robot may provide an interface to obtain joint positions that is not safety-rated, in which case the joint positions can be verified against images from sensors 102 (using, for example, safety-rated software). For example, received joint positions may be combined with static 3D models of each link to generate a 3D model of the entire robot 602. This 3D image can be used to remove any objects in the sensing data that are part of the robot itself. If the joint positions are correct, this will fully eliminate all object data attributed to the robot 602. If, however, the joint positions are incorrect, the true position of robot 602 will diverge from the model, and some parts of the detected robot will not be removed. Those points will then appear as a foreign object in the new cycle. In the previous cycle, it can be assumed that the joint positions were correct because otherwise robot 602 would have been halted. Since the base joint of the robot does not move, at least one of the divergent points must be close to the robot. The detection of an unexpected object close to robot 602 can then be used to trigger an error condition, which will cause control system 112 (see FIG. 1) to transition robot 602 to a safe state. Alternately, sensor data can be used to identify the position of the robot using a correlation algorithm, such as described above in the section on registration, and this detected position can be compared with the joint position reported by the robot. If the joint position information provided by robot 602 has been validated in this manner, it can be used to validate joint velocity information, which can then be used to predict future joint positions. If these positions are inconsistent with previously validated actual joint positions, the program can similarly trigger an error condition. These techniques enable use of a non-safety-rated interface to produce data that can then be used to perform additional safety functions.

Finally, RSDM 620 may be configured to determine the robot's joint state using only image information provided by sensors 102, without any information provided by robot 602 or controller 607. Given a model of all of the links in the robot, any of several conventional, well-known computer vision techniques can be used by RSDM 620 to register the model to sensor data, thus determining the location of the modeled object in the image. For example, the ICP algorithm (discussed above) minimizes the difference between two 3D point clouds. ICP often provides a locally optimal solution efficiently, and thus can be used accurately if the approximate location is already known. This will be the case if the algorithm is run every cycle, since robot 602 cannot have moved far from its previous position. Accordingly, globally optimal registration techniques, which may not be efficient enough to run in real time, are not required. Digital filters such as Kalman filters or particle filters can then be used to determine instantaneous joint velocities given the joint positions identified by the registration algorithm.

These image-based monitoring techniques often rely on being run at each system cycle, and on the assumption that the system was in a safe state at the previous cycle. Therefore, a test may be executed when robot 602 is started—for example, confirming that the robot is in a known, pre-configured "home" position and that all joint velocities are zero. It is common for automated equipment to have a set of tests that are executed by an operator at a fixed interval, for example, when the equipment is started up or on shift changes. Reliable state analysis typically requires an accurate model of each robot link. This model can be obtained a priori, e.g. from 3D CAD files provided by the robot manufacturer or generated by industrial engineers for a specific project. However, such models may not be available, at least not for the robot and all of the possible attachments it may have.

In this case, it is possible for RSDM 620 to create the model itself, e.g., using sensors 102. This may be done in a separate training mode where robot 602 runs through a set of motions, e.g., the motions that are intended for use in the given application and/or a set of motions designed to provide sensors 102 with appropriate views of each link. It is possible, but not necessary, to provide some basic information about the robot a priori, such as the lengths and rotational axes of each link. During this training mode, RSDM 620 generates a 3D model of each link, complete with all necessary attachments. This model can then be used by RSDM 620 in conjunction with sensor images to determine the robot state.

5.3 Determining Safe-Action Constraints

In traditional axis- and rate-limitation applications, an industrial engineer calculates what actions are safe for a robot, given the planned trajectory of the robot and the layout of the workspace—forbidding some areas of the robot's range of motion altogether and limiting speed in other areas. These limits assume a fixed, static workplace environment. Here we are concerned with dynamic environments in which objects and people come, go, and change position; hence, safe actions are calculated by a safe-action determination/motion plan generation module (SADM) 625 in real time based on all sensed relevant objects and on the current state of robot 602, and these safe actions may be updated each cycle. In order to be considered safe, actions should ensure that robot 602 does not collide with any stationary object, and also that robot 602 does not come into contact with a person who may be moving toward the robot. Since robot 602 has some maximum possible deceleration, controller 607 should be instructed to begin slowing the robot down sufficiently in advance to ensure that it can reach a complete stop before contact is made. Additionally or alternatively, SADM 625 may instruct controller 607 to change the trajectory and/or pose of robot 602 based on the selected trajectory in the constrained motion plan, which is updated in real-time in accordance with the monitored workspace as described above—thereby avoiding collision with the person and other objects and ensuring safety.

Figure 7:
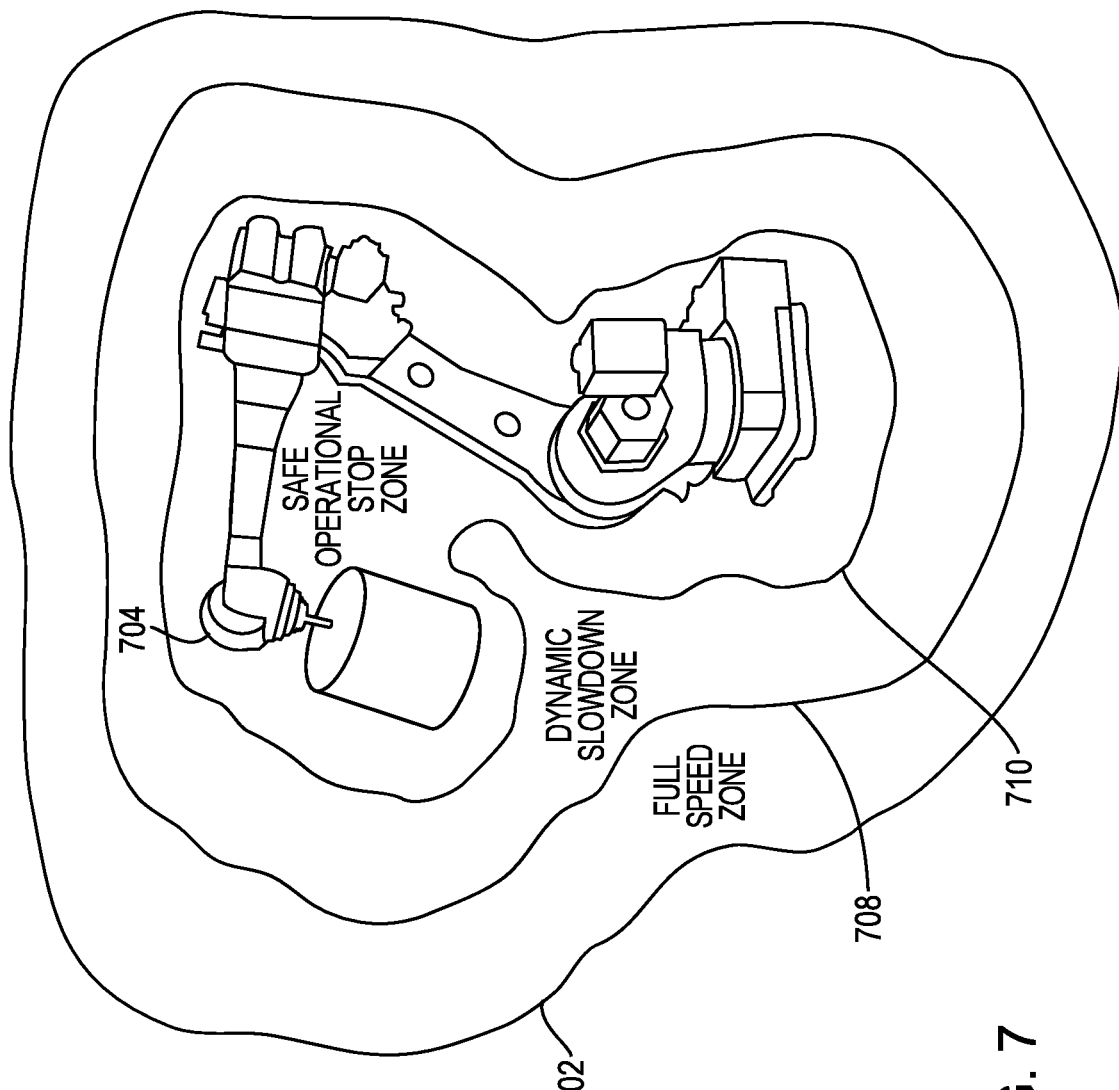
FIG. 7 schematically illustrates the definition of progressive safety envelopes in proximity to a piece of industrial machinery.
Figure 7:
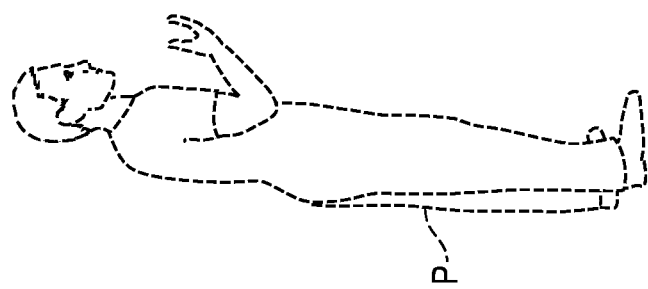

One approach to reducing the robot's velocity is to modulate the robot's maximum velocity (by which is meant the velocity of the robot itself or any appendage thereof) proportionally to the minimum distance between any point on the robot and any point in the relevant set of sensed objects to be avoided. The robot is allowed to operate at maximum speed when the closest object is further away than some threshold distance beyond which collisions are not a concern, and the robot is halted altogether if an object is within a certain minimum distance. Sufficient margin can be added to the specified distances to account for movement of relevant objects or humans toward the robot at some maximum realistic velocity. This is illustrated in FIG. 7. An outer envelope or 3D zone 702 is generated computationally by SADM 625 around the robot 704. Outside this zone 702, all movements of the person P are considered safe because, within an operational cycle, they cannot bring the person sufficiently close to the robot 704 to pose a danger. Detection of any portion of the person P's body within a second 3D zone 708, computationally defined within zone 702, is registered by SADM 625 but robot 704 is allowed to continue operating at full speed. If any portion of the person P crosses the threshold of zone 708 but is still outside an interior danger zone 710, robot 704 is signaled to operate at a slower speed. If any portion of the person P crosses into the danger zone 710—or is predicted to do so within the next cycle based on a model of human movement—operation of robot 704 is halted. These zones may be updated if robot 704 is moved (or moves) within the environment.

A refinement of this technique is for SADM 625 to control maximum velocity proportionally to the square root of the minimum distance, which reflects the fact that in a constant-deceleration scenario, velocity changes proportionally to the square root of the distance traveled, resulting in a smoother and more efficient, but still equally safe, result. A further refinement is for SADM 625 to modulate maximum velocity proportionally to the minimum possible time to collision— that is, to project the robot's current state forward in time, project the intrusions toward the robot trajectory, and identify the nearest potential collision. This refinement has the advantage that the robot will move more quickly away from an obstacle than toward it, which maximizes throughput while still correctly preserving safety. Since the robot's future trajectory depends not just on its current velocity but on subsequent commands, SADM 625 may consider all points reachable by robot 602 within a certain reaction time given its current joint positions and velocities, and cause control signals to be issued based on the minimum collision time among any of these states. Yet a further refinement is for SADM 625 to take into account the entire planned trajectory of the robot when making this calculation, rather than simply the instantaneous joint velocities.

Figure 8:
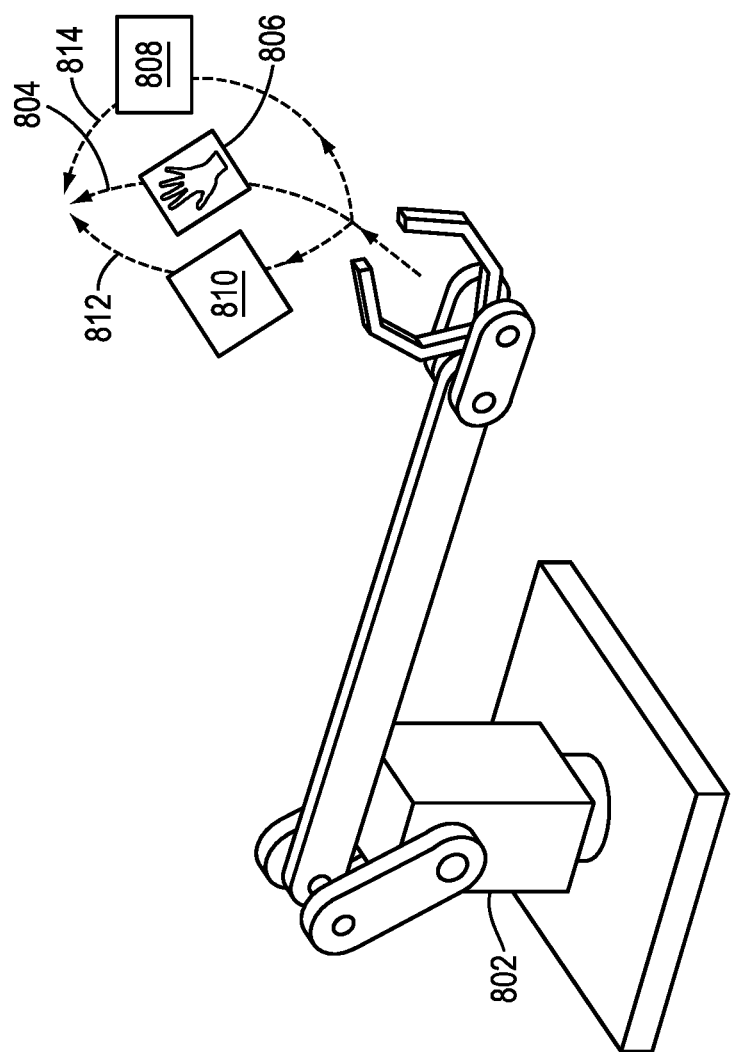
FIG. 8 schematically illustrates dynamic adjustment of a motion plan in real-time in response to an updated safe/unsafe zone in accordance with an embodiment of the invention.

Additionally, SADM 625 may, via robot controller 607, alter the robot's trajectory, rather than simply alter the maximum speed along that trajectory. It is possible to choose from among a fixed set of trajectories one that reduces or eliminates potential collisions, or even to generate a new trajectory on the fly. For example, referring to FIG. 8, robot 802 may be operated based on a selected trajectory 804 in a constrained motion plan generated at an instant $t_1$. At instant $t_2$, analysis module 342, upon analyzing data received from sensor system 102, detects an operator's arm in a region 806 and, based thereon, updates region 806 as an unsafe zone. In addition, the analysis module 342 may define the regions 808, 810 as safe zones as the voxels associated therewith are marked as unoccupied. Based on the updated safe/unsafe zone definition from analysis module 342, SADM 625 may adjust the motion plan in real-time such that robot 802 will not enter the updated unsafe zone 806. Again, because the updated motion plan may include multiple trajectories 812, 814 of robot 802 via going through the region 808 or 810, respectively, the cost values assigned to trajectories 812, 814 may be updated, and the optimal trajectory of the robot 802 may be selected based on the updated cost values as described above.

While not necessarily a safety violation, collisions with static elements of the workspace are generally not desirable. The set of relevant objects can include all objects in the workspace, including both static background such as walls and tables, and moving objects such as workpieces and human workers. Either from prior configuration or run-time detection, sensors 102 and analysis module 342 may be able to infer which objects could possibly be moving. In this case, any of the algorithms described above can be refined to leave additional margins to account for objects that might be moving, but to eliminate those margins for objects that are known to be static, so as not to reduce throughput unnecessarily but still automatically eliminate the possibility of collisions with static parts of the work cell.

Beyond simply leaving margins to account for the maximum velocity of potentially moving objects, state estimation techniques based on information detected by the sensing system can be used to project the movements of humans and other objects forward in time, thus expanding the control options available to control routines 350. For example, skeletal tracking techniques can be used to identify moving limbs of humans that have been detected and limit potential collisions based on properties of the human body and estimated movements of, e.g., a person's arm rather than the entire person.

5.4 Communicating Safe Action Constraints to the Robot

The safe-action constraints identified by SADM 625 may be communicated by OMS 610 to robot controller 607 on each cycle via a robot communication module 630. As described above, the communication module may correspond to an I/O port 327 interface to a complementary port on robot controller 607 or may correspond to transceiver 325. Most industrial robots provide a variety of interfaces for use with external devices. A suitable interface should operate with low latency at least at the control frequency of the system. The interface can be configured to allow the robot to be programmed and run as usual, with a maximum velocity, a trajectory and/or a pose being sent over the interface. In accordance with the inputs on the interface, SADM 625 may generate/update a constrained motion plan of the robot and, via the robot controller 607, operate the robot based on the generated/updated motion plan as described above. Alternatively, some interfaces allow for trajectories to be delivered in the form of waypoints. Using this type of an interface, the intended trajectory of robot 602 can be received and stored within OMS 610, which may then generate waypoints that are closer together or further apart depending on the safe-action constraints. Similarly, an interface that allows input of target joint torques can be used to drive trajectories computed in accordance herewith. These types of interface can also be used where SADM 625 chooses new trajectories or modifies trajectories depending on the safe-action constraints.

As with the interface used to determine robot state, if robot 602 supports a safety-rated protocol that provides real-time access to the relevant safety-rated control inputs, this may be sufficient. However, a safety-rated protocol is not available, additional safety-rated software on the system can be used to ensure that the entire system remains safe. For example, SADM 625 may determine the expected speed and position of the robot if the robot is operating in accordance with the safe actions that have been communicated. SADM 625 then determines the robot's actual state as described above. If the robot's actions do not correspond to the expected actions, SADM 625 causes the robot to transition to a safe state, typically using an emergency stop signal. This effectively implements a real-time safety-rated control scheme without requiring a real-time safety-rated interface beyond a safety-rated stopping mechanism.

In some cases a hybrid system may be optimal—many robots have a digital input that can be used to hold a safety-monitored stop. It may be desirable to use a communication protocol for variable speed, for example, when intruding objects are relatively far from the robot, but to use a digital safety-monitored stop when the robot must come to a complete stop, for example, when intruding objects are close to the robot.

Certain embodiments of the present invention are described above. It is, however, expressly noted that the present invention is not limited to those embodiments; rather, additions and modifications to what is expressly described herein are also included within the scope of the invention.

What is claimed is:

1. A method of safely operating machinery in a three-dimensional workspace, the method comprising:

monitoring at least a portion of the workspace with a sensor associated with a grid of pixels for recording images of the at least a portion of the workspace within a field of view of the sensor;

based on the recorded images, computationally generating a three-dimensional representation of the at least a portion of workspace as a plurality of 3D volumes stored in a computer memory;

identifying volumes within the field of view of the sensor as occupied or unoccupied; and mapping one or more safe volumetric zones within the workspace based at least in part on the identified volumes.

2. The method of claim 1, wherein at least one said safe volumetric zone is mapped based at least in part on user input.

3. The method of claim 2, wherein the at least one said safe volumetric zone is disposed outside of the field of view of the sensor.

4. The method of claim 2, wherein the user input overrides a mapping based on images recorded by the sensor.

5. The method of claim 1, wherein identifying a volume as occupied comprises receiving light reflected from an object disposed in the volume, an intensity of the reflected light being higher than a predetermined threshold.

6. The method of claim 1, wherein one or more objects within the field of view of the sensor are insufficiently reflective to reflect light, back to the sensor, having an intensity higher than the threshold.

7. The method of claim 1, further comprising associating the one or more safe volumetric zones with a safety criterion.

8. The method of claim 7, wherein the safety criterion corresponds to a minimum distance from a piece of the controlled machinery.

9. The method of claim 1, wherein the one or more safe volumetric zones include only the volumes that have been identified as unoccupied.

10. The method of claim 1, further comprising, based on the recorded images, identifying a workpiece and/or at least an element of the machinery using a neural network.

11. The method of claim 1, wherein identifying volumes within the field of view of the sensor as occupied or unoccupied comprises:
  detecting an occlusion in the field of view of the sensor;
  classifying the volumes associated with the occlusion as occupied volumes; and
  classifying the volumes between the sensor and the occupied volumes in the field of view of the sensor as unoccupied volumes.

12. The method of claim 1, wherein the sensor comprises at least one of a time-of-flight sensor, a 3D LIDAR sensor, or a stereo vision camera.

13. The method of claim 1, further comprising:
monitoring at least a second portion of the workspace with one or more second sensors each associated with a grid of pixels for recording images of the at least a second portion of the workspace within a field of view of each second sensor; and
identifying volumes within the field of view of each second sensor as occupied or unoccupied.

14. The method of claim 1, further comprising:
receiving a task specification; and
computationally generating a motion plan comprising at least one trajectory of the machinery to perform a specified task within the one or more safe volumetric zones.

15. The method of claim 14, further comprising:
monitoring at least a second portion of the workspace with one or more second sensors each associated with a grid of pixels for recording images of the at least a second portion of the workspace within a field of view of each second sensor; and
identifying volumes within the field of view of each second sensor as occupied or unoccupied,
wherein mapping the one or more safe volumetric zones within the workspace is further based on the identified volumes within the field of view of each second sensor.

16. The method of claim 14, further comprising operating the machinery in accordance with the motion plan.

17. The method of claim 14, wherein the motion plan comprises a plurality of trajectories of the machinery, the method further comprising:
  assigning a cost value to each of the trajectories;
  selecting one of the trajectories based at least in part on the cost values assigned to the trajectories; and
  causing the machinery to execute the selected trajectory.

18. The method of claim 17, wherein the cost value associated with each of the trajectories is assigned based at least in part on a length of the trajectory, an operation time of the machinery on the trajectory, and/or allowed kinematics of the trajectory.

19. The method of claim 14, wherein the motion plan precludes entry into a volumetric zone outside the one or more safe volumetric zones by the machinery and any workpiece associated with the machinery or the task.

20. The method of claim 14, further comprising real-time monitoring of the workspace and altering the motion plan in response to a change in the one or more safe volumetric zones.

* * * * *